(12) United States Patent
Dong et al.

(10) Patent No.: US 12,696,276 B2
(45) Date of Patent: Jul. 28, 2026

(54) COMMUNICATION METHOD AND APPARATUS

(71) Applicant: HUAWEI TECHNOLOGIES CO., LTD., Shenzhen (CN)

(72) Inventors: Lei Dong, Shanghai (CN); Hongjia Su, Shanghai (CN); Lei Lu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 613 days.

(21) Appl. No.: 17/968,834

(22) Filed: Oct. 19, 2022

(65) Prior Publication Data

US 2023/0038246 A1 Feb. 9, 2023

Related U.S. Application Data

(63) Continuation of application No. PCT/CN2020/086813, filed on Apr. 24, 2020.

(51) Int. Cl.
*H04W 72/20* (2023.01)

(52) U.S. Cl.
CPC ................................... *H04W 72/20* (2023.01)

(58) Field of Classification Search
CPC ....... H04W 72/20; H04W 72/02; H04W 4/46; H04W 4/70; H04W 72/25; H04W 4/40
See application file for complete search history.

(56) References Cited

U.S. PATENT DOCUMENTS

| | | | |
|---|---|---|---|
| 12,069,753 B2 * | 8/2024 | Zhao ........................ | H04W 4/46 |
| 2018/0159935 A1 * | 6/2018 | Cavalcanti .............. | H04W 4/40 |
| 2020/0029340 A1 | 1/2020 | He et al. | |

(Continued)

FOREIGN PATENT DOCUMENTS

| | | |
|---|---|---|
| CN | 109548173 A | 3/2019 |
| CN | 104640211 B | 6/2019 |

(Continued)

OTHER PUBLICATIONS

India Examination Report issued in corresponding India Patent Application No. 202237061654, dated Aug. 8, 2023, pp. 1-6.

(Continued)

*Primary Examiner* — Kan Yuen
(74) *Attorney, Agent, or Firm* — HAUPTMAN HAM, LLP

(57) ABSTRACT

A communication method and apparatus that is used in fields such as V2X, an internet of vehicles, intelligent driving, and assisted driving. The method includes a first terminal apparatus detects SCI from at least one second terminal apparatus, to determine a first resource. The first terminal apparatus sends, to the third terminal apparatus, first information for triggering determining of second information, and receives the second information from the third terminal apparatus. The first terminal apparatus determines, based on the first resource and the second resource, the resource for sending the data. The first terminal apparatus selects, based on a sensing result of the first terminal apparatus and the resource recommended by the third terminal apparatus, the resource for sending the data, so that both interference around the first terminal apparatus and interference around the third terminal apparatus are considered, thereby reducing interference and improving communication quality.

8 Claims, 13 Drawing Sheets

(56)  References Cited

U.S. PATENT DOCUMENTS

| | | | |
|---|---|---|---|
| 2020/0229205 A1* | 7/2020 | Bharadwaj | H04L 5/0053 |
| 2020/0236655 A1* | 7/2020 | Bharadwaj | H04L 5/0051 |
| 2021/0112544 A1* | 4/2021 | Chen | H04W 52/242 |
| 2021/0144681 A1* | 5/2021 | Gulati | H04W 24/08 |
| 2021/0195560 A1* | 6/2021 | Ryu | H04B 7/0695 |
| 2021/0212044 A1* | 7/2021 | Ryu | H04W 72/0453 |
| 2022/0167125 A1* | 5/2022 | Jiang | H04W 4/08 |
| 2022/0264533 A1* | 8/2022 | Zhang | H04L 1/1812 |

FOREIGN PATENT DOCUMENTS

| | | | |
|---|---|---|---|
| CN | 110830952 A | 2/2020 | |
| CN | 110958696 A | 4/2020 | |
| EP | 3550905 A1 | 10/2019 | |
| EP | 3860266 A4 | 12/2021 | |
| WO | 2020033088 A1 | 2/2020 | |
| WO | 2020063647 A1 | 4/2020 | |

OTHER PUBLICATIONS

Huawei, HiSilicon, Introduction of 5G V2X with NR sidelink. 3GPP TSG-RAN2 WG2 Meeting #108, Reno, Nevada, 18 Nov. 22, 2019, R2-2001966, 491 pages.
3GPP TS 38.214 V16.1.0 (Mar. 2020), 3rd Generation Partnership Project; Technical Specification Group Radio Access Network; NR; Physical layer procedures for data(Release 16), 151 pages.
3GPP TS 38.213 V16.1.0 (Mar. 2020), 3rd Generation Partnership Project; Technical Specification Group Radio Access Network; NR; Physical layer procedures for control(Release 16), 156 pages.
3GPP TS 38.321 V16.0.0 (Mar. 2020), 3rd Generation Partnership Project; Technical Specification Group Radio Access Network; NR; Medium Access Control (MAC) protocol specification(Release 16), 141 pages.
3GPP TS 38.211 V16.1.0 (Mar. 2020), 3rd Generation Partnership Project; Technical Specification Group Radio Access Network; NR; Physical channels and modulation(Release 16), 130 pages.
3GPP TS 23.287 V16.2.0 (Mar. 2020), 3rd Generation Partnership Project; Technical Specification Group Services and System Aspects; Architecture enhancements for 5G System (5GS) to support Vehicle-to-Everything (V2X) services (Release 16), 53 pages.
3GPP TS 38.331 V16.0.0 (Mar. 2020), 3rd Generation Partnership Project; Technical Specification Group Radio Access Network; NR; Radio Resource Control (RRC) protocol specification(Release 16), 835 pages.
3GPP TS 38.212 V16.1.0 (Mar. 2020), 3rd Generation Partnership Project; Technical Specification Group Radio Access Network; NR; Multiplexing and channel coding(Release 16), 146 pages.
International Search Report issued in corresponding International Application No. PCT/CN2020/086813, dated Jan. 4, 2021, pp. 1-10.
Extended European Search Report issued in corresponding European Application No. 20932185.0, dated Apr. 5, 2023, pp. 1-11.

* cited by examiner

COMMUNICATION METHOD AND APPARATUS

CROSS-REFERENCE TO RELATED APPLICATIONS

This application is a continuation of International Application No. PCT/CN2020/086813, filed on Apr. 24, 2020, the disclosure of which is hereby incorporated in entirety by reference.

BACKGROUND

Vehicle-to-everything (vehicle-to-everything, V2X) communication is intended for high-speed devices represented by vehicles, and is a technology used in scenarios, for example, intelligent vehicles, autonomous driving, or intelligent transportation, with a high communication delay condition. In a V2X communication process, user equipment (user equipment, UE) communicates with other UE through a sidelink (sidelink, SL).

New radio (new radio, NR) V2X communication supports communication scenarios with network coverage and communication scenarios without network coverage. In NR V2X, sidelink-related resource allocation includes two modes: a mode in which a base station allocates a resource (mode-1) and a mode in which UE autonomously selects a resource (mode-2). In the mode in which a base station allocates a resource, the base station allocates the resource to UE by using a buffer status report (buffer status report, BSR) received from the UE. This mode relies on the base station, and is applied to scenarios with network coverage. As limited by the network coverage, this mode is poor in adaptability. In the mode in which UE autonomously selects a resource, transmit UE excludes, from a resource pool based on a sensing (sensing) result, a resource that has been reserved by other UE, and resources in the resource pool that remain after the exclusion are available resources, so that the transmit UE selects a resource from the available resources to send data. This mode relies on the sensing result of the transmit UE. In response to signal attenuation between the transmit UE and other transmit UE is severe, for example, a distance between the transmit UE and the other transmit UE is long, the transmit UE is unable to sense a resource reserved by the other transmit UE. Consequently, the transmit UE selects the same resource as the other transmit UE did. This causes a resource collision and strong interference.

SUMMARY

Some embodiments provide a communication method and apparatus, to reduce interference and improve communication quality.

Some embodiments provide a communication method. The method includes: detecting sidelink control information SCI from at least one second terminal apparatus, to determine a first resource, where the first resource includes a resource unavailable to send data to a third terminal apparatus; sending first information to the third terminal apparatus, where the first information is for triggering determining of second information; receiving the second information from the third terminal apparatus, where the second information indicates a second resource, and the second resource is for determining a resource for sending the data to the third terminal apparatus; determining a third resource based on the first resource and the second resource; and sending first data to the third terminal apparatus through the third resource.

The method is performed by a first communication apparatus. The first communication apparatus is a communication device, or is a communication apparatus, for example, a chip, that supports the communication device to implement a function called for in the method. For example, the first communication apparatus is a terminal apparatus, and the terminal apparatus is a terminal device, a chip configured in the terminal device to implement a function of the terminal device, or another component configured to implement the function of the terminal device. In the following description process, an example in which the first communication apparatus is a first terminal apparatus is used.

In some embodiments, the first terminal apparatus sends the first information to the third terminal apparatus, to trigger the third terminal apparatus to send the second information to the first terminal apparatus, where the second information indicates the second resource. In response to selecting the resource for sending the data, the first terminal apparatus is configured to use the second resource as a reference resource. The first terminal apparatus selects, based on not a sensing result of the first terminal apparatus but further the second resource indicated by the third terminal apparatus as the reference resource, the resource for sending the data. Because the second resource is determined by the third terminal apparatus based on a sensing result of the third terminal apparatus, and indicates a degree of interference caused by another terminal apparatus to the third terminal apparatus, the first terminal apparatus selects an appropriate resource based on the sensing result of the third terminal apparatus and the sensing result of the first terminal apparatus to send the data, to reduce interference, a resource conflict caused by selecting a resource the same as that of another terminal apparatus, and a resource waste caused by failing in appropriate use of a reusable resource due to excessive exclusion.

In some embodiments, the receiving the second information from the third terminal apparatus includes: receiving first control information from the third terminal apparatus, where the first control information includes first SCI, the first SCI is 1st-stage SCI, the second information is a first field in the first SCI, and the first field is a resource reservation field or a reserved field. In this implementation, the third terminal apparatus is configured to indicate the second resource by using the first field in the 1st-stage SCI, and the first terminal apparatus obtains the second resource by parsing the 1st-stage SCI, to select the resource. In addition, the first field is the resource reservation field or the reserved field. In response to the third terminal apparatus reusing the resource reservation field in the 1st-stage SCI to indicate the second resource, a change to 1st-stage SCI in an existing release is reduced. In response to the third terminal apparatus using the reserved field in the 1st-stage SCI to indicate the second resource, 1st-stage SCI in an existing release is compatible with.

In some embodiments, the first SCI further includes a second field, and the second field indicates that the second resource is for determining the resource for sending the data to the third terminal apparatus. For example, because a resource reservation field in the 1st-stage SCI in the existing release indicates a reserved resource, in response to the third terminal apparatus reusing the resource reservation field in the 1st-stage SCI to indicate the second resource, the third terminal apparatus is configured to use the reserved field in the 1st-stage SCI to indicate that the resource indicated by the current resource reservation field is the resource for determining to send the data to the third terminal apparatus, to distinguish from the resource reservation field in the 1st-stage SCI in the existing release. In this way, the 1st-stage SCI in the existing release is compatible with. The first terminal apparatus parses the first field and the second field in the 1st-stage SCI, to obtain the second resource and select the resource based on the second resource.

In some embodiments, in response to the first field being the resource reservation field, a period field in the first SCI indicates a period of the second resource, and a priority field in the first SCI indicates a priority of the second resource. In this implementation, in response to the first field being the resource reservation field in the 1st-stage SCI in the existing release, the third terminal apparatus further reuses a period field in the 1st-stage SCI in the existing release to indicate the period of the second resource, and reuse a priority field in the 1st-stage SCI in the existing release to indicate the priority of the second resource, to distinguish from the period field and the priority field in the 1st-stage SCI in the existing release. The first terminal apparatus obtains the period of the second resource and the priority of the second resource by parsing the 1st-stage SCI, to select, based on the period of the second resource, the priority of the second resource, and a period and a priority of to-be-sent data, an appropriate resource to carry the to-be-sent data.

In some embodiments, the sending first information to the third terminal apparatus includes: sending second control information to the third terminal apparatus, where the second control information includes third SCI and fourth SCI, the third SCI is 1st-stage SCI, the fourth SCI is 2nd-stage SCI, and the fourth SCI includes the first information, or the third SCI includes the first information. In this implementation, the first terminal apparatus sends the first information to the third terminal apparatus, to trigger the third terminal apparatus to determine, based on the sensing result, the resource used by the first terminal apparatus to send the data, so that the first terminal apparatus performs resource exclusion based on the sensing result of the first terminal apparatus and the sensing result of the third terminal apparatus. In response to the 1st-stage SCI including trigger information, the third terminal apparatus parses the 1st-stage SCI to trigger obtaining of the second resource. In response to the 2nd-stage SCI including trigger information, the third terminal apparatus parses the 2nd-stage SCI to trigger obtaining of the second resource.

In some embodiments, in response to the fourth SCI including the first information, the third SCI includes a third field, and the third field indicates that the fourth SCI includes the first information.

In some embodiments, the third SCI includes a fourth field, and the fourth field indicates whether a fourth resource exists and/or a manner of obtaining the fourth resource; or the fourth SCI includes a fifth field, and the fifth field indicates whether a fourth resource exists and/or a manner of obtaining the fourth resource. The fourth resource is a resource for sending the second information. The manner of obtaining the fourth resource includes: The fourth resource is indicated by the third SCI, is indicated by the fourth SCI, is configured by a higher layer, or is carried by a MAC-CE. In this implementation, the first terminal apparatus is configured to indicate, to the third terminal apparatus based on the sensing result of the first terminal apparatus, the fourth resource for sending the second information. In this way, in response to selecting the resource for sending the second information, the third terminal apparatus considers a sensing status of the third terminal apparatus and a sensing status of the first terminal apparatus, to improve a success rate of receiving the second information by the first terminal apparatus.

In some embodiments, in response to the fourth SCI including the fifth field, the third SCI further includes a sixth field, and the sixth field indicates that the fourth SCI includes the fifth field.

In some embodiments, the third SCI includes a seventh field, and the seventh field indicates whether third information exists and/or a manner of obtaining the third information; or the fourth SCI includes an eighth field, and the eighth field indicates whether third information exists and/or a manner of obtaining the third information. The third information is for determining the second resource, and the third information includes at least one of a sending period of the first data, a priority of the first data, a data packet size of the first data, or a delay condition of the first data. A manner of obtaining the sending period of the first data includes: The sending period is indicated by the third SCI, is indicated by the fourth SCI, is configured by the higher layer, or is carried by a MAC-CE. A manner of obtaining the priority of the first data includes: The priority is indicated by the third SCI, is indicated by the fourth SCI, is configured by the higher layer, or is carried by a MAC-CE. A manner of obtaining the data packet size of the first data includes: The data packet size is indicated by the fourth SCI, is implicitly indicated by the fourth resource, is configured by the higher layer, or is carried by a MAC-CE. A manner of obtaining the delay condition of the first data includes: The delay condition is indicated by the fourth SCI, is configured by the higher layer, or is carried by a MAC-CE. In this implementation, the first terminal apparatus indicates the at least one of a sending period of the first data, a priority of the first data, a data packet size of the first data, or a delay condition of the first data to the third terminal apparatus. Because the third information is related to the first data to be sent by the first terminal apparatus, after obtaining the third information, the third terminal apparatus selects, for the first terminal apparatus based on the sensing result of the third terminal apparatus and the third information, a resource that matches the first data.

In some embodiments, in response to the fourth SCI including the eighth field, the third SCI further includes a ninth field, and the ninth field indicates that the fourth SCI includes the eighth field.

In some embodiments, the detecting sidelink control information SCI from at least one second terminal apparatus, to determine a first resource further includes: detecting the SCI from the at least one second terminal apparatus, to determine a fifth resource; and the sending first information to the third terminal apparatus includes: sending the first information to the third terminal apparatus through the fifth resource.

Some embodiments provide a communication method. This includes: receiving first information from a first terminal apparatus, where the first information is for triggering determining of second information; detecting sidelink control information SCI from at least one fourth terminal apparatus, to determine a second resource, where the second resource is for determining a resource used by the first terminal apparatus to send data; and sending the second information to the first terminal apparatus, where the second information indicates the second resource.

The method is performed by a second communication apparatus. The second communication apparatus is a communication device, or is a communication apparatus, for example, a chip, that supports the communication device to implement a function called for in the method. For example, the second communication apparatus is a terminal apparatus, and the terminal apparatus is a terminal device, a chip configured in the terminal device to implement a function of the terminal device, or another component configured to implement the function of the terminal device. In the following description process, an example in which the second communication apparatus is a third terminal apparatus is used.

In some embodiments, the sending the second information to the first terminal apparatus includes:

sending first control information to the first terminal apparatus, where the first control information includes first SCI, the first SCI is 1st-stage SCI, the second information is a first field in the first SCI, and the first field is a resource reservation field or a reserved field.

In some embodiments, the first SCI further includes a second field, and the second field indicates that the second resource is the resource used by the first terminal apparatus to send the data.

In some embodiments, in response to the first field being the resource reservation field, a period field in the first SCI indicates a period of the second resource, and a priority field in the first SCI indicates a priority of the second resource.

In some embodiments, the receiving first information from a first terminal apparatus includes:

receiving second control information from the first terminal apparatus, where the second control information includes third SCI and fourth SCI, the third SCI is 1st-stage SCI, the fourth SCI is 2nd-stage SCI, and the fourth SCI includes the first information, or the third SCI includes the first information.

In some embodiments, in response to the fourth SCI including the first information, the third SCI further includes a third field, and the third field indicates that the fourth SCI includes the first information.

In some embodiments, the third SCI includes a fourth field, and the fourth field indicates whether a fourth resource exists and/or a manner of obtaining the fourth resource; or the fourth SCI includes a fifth field, and the fifth field indicates whether a fourth resource exists and/or a manner of obtaining the fourth resource.

The fourth resource is a resource for sending the second information, and the manner of obtaining the fourth resource includes: The fourth resource is indicated by the third SCI, is indicated by the fourth SCI, is configured by a higher layer, or is carried by a MAC-CE.

In some embodiments, in response to the fourth SCI including the fifth field, the third SCI further includes a sixth field, and the sixth field indicates that the fourth SCI includes the fifth field.

In some embodiments, the method further includes:

determining a sixth resource based on the fourth resource through the detection of the SCI from the at least one fourth terminal apparatus; and the sending the second information to the first terminal apparatus includes:

sending the second information to the first terminal apparatus through the sixth resource.

In some embodiments, the third SCI includes a seventh field, and the seventh field indicates whether third information exists and/or a manner of obtaining the third information; or the fourth SCI includes an eighth field, and the eighth field indicates whether third information exists and/or a manner of obtaining the third information.

The third information is for determining the second resource, and the third information includes at least one of a sending period of first data, a priority of the first data, a data packet size of the first data, or a delay condition of the first data. A manner of obtaining the sending period of the first data includes: The sending period is indicated by the third SCI, is indicated by the fourth SCI, is configured by the higher layer, or is carried by a MAC-CE. A manner of obtaining the priority of the first data includes: The priority is indicated by the third SCI, is indicated by the fourth SCI, is configured by the higher layer, or is carried by a MAC-CE. A manner of obtaining the data packet size of the first data includes: The data packet size is indicated by the fourth SCI, is implicitly indicated by the fourth resource, is configured by the higher layer, or is carried by a MAC-CE. A manner of obtaining the delay condition of the first data includes: The delay condition is indicated by the fourth SCI, is configured by the higher layer, or is carried by a MAC-CE.

In some embodiments, in response to the fourth SCI including the eighth field, the third SCI further includes a ninth field, and the ninth field indicates that the fourth SCI includes the eighth field.

In some embodiments, the detecting sidelink control information from at least one fourth terminal apparatus, to determine a second resource includes:

determining the second resource based on the third information through the detection of the SCI from the at least one fourth terminal apparatus.

For technical effects or some optional implementations, refer to the descriptions of the technical effects or the corresponding implementations.

Some embodiments provide a communication apparatus. For example, the communication apparatus is the first communication apparatus described above. The first communication apparatus is configured to perform the method according to some embodiments. Specifically, the first communication apparatus includes modules configured to perform the method according to some embodiments, for example, include a processing module and a transceiver module. For example, the transceiver module includes a sending module and a receiving module. The sending module and the receiving module is different functional modules, or is a same functional module but implements different functions. For example, the first communication apparatus is a communication device, or is a chip or another component configured in the communication device. For example, the communication device is a terminal device. The following uses an example in which the first communication apparatus is a first terminal apparatus. The first terminal apparatus is a terminal device, or is a chip or another component configured in the terminal device. For example, the transceiver module alternatively is implemented by a transceiver, and the processing module alternatively is implemented by a processor. Alternatively, the sending module is implemented by a transmitter, and the receiving module is implemented by a receiver. The transmitter and the receiver is different functional modules, or is a same functional module but implements different functions. In response to the first communication apparatus being a communication device, the transceiver is implemented, for example, by an antenna, a feeder, and a codec in the communication device. Alternatively, in response to the first communication apparatus being a chip configured in a communication device, the transceiver (or the transmitter and the receiver) is, for example, a communication interface in the chip. The communication interface is connected to a radio frequency transceiver component in the communication device, to send and receive information through the radio frequency transceiver component. In a description process, an example in which the first communication apparatus is the first terminal apparatus and includes the processing module and the transceiver module is used.

The processing module is configured to detect sidelink control information SCI from at least one second terminal apparatus, to determine a first resource, where the first resource includes a resource unavailable to send data to a third terminal apparatus.

The transceiver module is configured to: send first information to the third terminal apparatus, where the first information is for triggering determining of second information; and receive the second information from the third terminal apparatus, where the second information indicates a second resource, and the second resource is for determining a resource for sending the data to the third terminal apparatus.

The processing module is further configured to determine a third resource based on the first resource and the second resource.

The transceiver module is further configured to send first data to the third terminal apparatus through the third resource.

In some embodiments, the transceiver module is configured to:

receive first control information from the third terminal apparatus, where the first control information includes first SCI, the first SCI is 1st-stage SCI, the second information is a first field in the first SCI, and the first field is a resource reservation field or a reserved field.

In some embodiments, the first SCI further includes a second field, and the second field indicates that the second resource is for determining the resource for sending the data to the third terminal apparatus.

In some embodiments, in response to the first field being the resource reservation field, a period field in the first SCI indicates a period of the second resource, and a priority field in the first SCI indicates a priority of the second resource.

In some embodiments, the transceiver module is configured to:

send second control information to the third terminal apparatus, where the second control information includes third SCI and fourth SCI, the third SCI is 1st-stage SCI, the fourth SCI is 2nd-stage SCI, and the fourth SCI includes the first information, or the third SCI includes the first information.

In some embodiments, in response to the fourth SCI including the first information, the third SCI includes a third field, and the third field indicates that the fourth SCI includes the first information.

In some embodiments, the third SCI includes a fourth field, and the fourth field indicates whether a fourth resource exists and/or a manner of obtaining the fourth resource; or the fourth SCI includes a fifth field, and the fifth field indicates whether a fourth resource exists and/or a manner of obtaining the fourth resource.

The fourth resource is a resource for sending the second information, and the manner of obtaining the fourth resource includes: The fourth resource is indicated by the third SCI, is indicated by the fourth SCI, is configured by a higher layer, or is carried by a MAC-CE.

In some embodiments, in response to the fourth SCI including the fifth field, the third SCI further includes a sixth field, and the sixth field indicates that the fourth SCI includes the fifth field.

In some embodiments, the third SCI includes a seventh field, and the seventh field indicates whether third information exists and/or a manner of obtaining the third information; or the fourth SCI includes an eighth field, and the eighth field indicates whether third information exists and/or a manner of obtaining the third information.

The third information is for determining the second resource, and the third information includes at least one of a sending period of the first data, a priority of the first data, a data packet size of the first data, or a delay condition of the first data. A manner of obtaining the sending period of the first data includes: The sending period is indicated by the third SCI, is indicated by the fourth SCI, is configured by the higher layer, or is carried by a MAC-CE. A manner of obtaining the priority of the first data includes: The priority is indicated by the third SCI, is indicated by the fourth SCI, is configured by the higher layer, or is carried by a MAC-CE. A manner of obtaining the data packet size of the first data includes: The data packet size is indicated by the fourth SCI, is implicitly indicated by the fourth resource, is configured by the higher layer, or is carried by a MAC-CE. A manner of obtaining the delay condition of the first data includes: The delay condition is indicated by the fourth SCI, is configured by the higher layer, or is carried by a MAC-CE.

In some embodiments, in response to the fourth SCI including the eighth field, the third SCI further includes a ninth field, and the ninth field indicates that the fourth SCI includes the eighth field.

In some embodiments, the processing module is further configured to:

detect the SCI from the at least one second terminal apparatus, to determine a fifth resource.

The transceiver module is configured to:

send the first information to the third terminal apparatus through the fifth resource.

For technical effects the optional implementations, refer to the descriptions of the technical effects or the corresponding implementations.

Some embodiments provide a communication apparatus. For example, the communication apparatus is the second communication apparatus described above. The second communication apparatus is configured to perform the method according to some embodiments. Specifically, the second communication apparatus includes modules configured to perform the method according to some embodiments, for example, include a processing module and a transceiver module. For example, the transceiver module includes a sending module and a receiving module. The sending module and the receiving module is different functional modules, or is a same functional module but implements different functions. For example, the second communication apparatus is a communication device, or is a chip or another component configured in the communication device. For example, the communication device is a terminal device. The following uses an example in which the second communication apparatus is a third terminal apparatus. The third terminal apparatus is a terminal device, or is a chip or another component configured in the terminal device. For example, the transceiver module alternatively is implemented by a transceiver, and the processing module alternatively is implemented by a processor. Alternatively, the sending module is implemented by a transmitter, and the receiving module is implemented by a receiver. The transmitter and the receiver is different functional modules, or is a same functional module but implements different functions. In response to the second communication apparatus being a communication device, the transceiver is implemented, for example, by an antenna, a feeder, and a codec in the communication device. Alternatively, in response to the second communication apparatus being a chip configured in a communication device, the transceiver (or the transmitter and the receiver) is, for example, a communication interface in the chip. The communication interface is connected to a radio frequency transceiver component in the communication device, to send and receive information through the radio frequency transceiver component. In a description process, an example in which the second communication apparatus is the third terminal apparatus and includes the processing module and the transceiver module is used.

The transceiver module is configured to receive first information from a first terminal apparatus, where the first information is for triggering determining of second information.

The processing module is configured to detect sidelink control information SCI from at least one fourth terminal apparatus, to determine a second resource, where the second resource is for determining a resource used by the first terminal apparatus to send data.

The transceiver module is further configured to send the second information to the first terminal apparatus, where the second information indicates the second resource.

In some embodiments, the transceiver module is configured to:

send first control information to the first terminal apparatus, where the first control information includes first SCI, the first SCI is 1st-stage SCI, the second information is a first field in the first SCI, and the first field is a resource reservation field or a reserved field.

In some embodiments, the first SCI further includes a second field, and the second field indicates that the second resource is the resource used by the first terminal apparatus to send the data.

In some embodiments, in response to the first field being the resource reservation field, a period field in the first SCI indicates a period of the second resource, and a priority field in the first SCI indicates a priority of the second resource.

In some embodiments, the transceiver module is configured to:

receive second control information from the first terminal apparatus, where the second control information includes third SCI and fourth SCI, the third SCI is 1st-stage SCI, the fourth SCI is 2nd-stage SCI, and the fourth SCI includes the first information, or the third SCI includes the first information.

In some embodiments, in response to the fourth SCI including the first information, the third SCI further includes a third field, and the third field indicates that the fourth SCI includes the first information.

In some embodiments, the third SCI includes a fourth field, and the fourth field indicates whether a fourth resource exists and/or a manner of obtaining the fourth resource; or the fourth SCI includes a fifth field, and the fifth field indicates whether a fourth resource exists and/or a manner of obtaining the fourth resource.

The fourth resource is a resource for sending the second information, and the manner of obtaining the fourth resource includes: The fourth resource is indicated by the third SCI, is indicated by the fourth SCI, is configured by a higher layer, or is carried by a MAC-CE.

In some embodiments, in response to the fourth SCI including the fifth field, the third SCI further includes a sixth field, and the sixth field indicates that the fourth SCI includes the fifth field.

In some embodiments, the processing module is further configured to:

determine a sixth resource based on the fourth resource through the detection of the SCI from the at least one fourth terminal apparatus.

The transceiver module is configured to:

send the second information to the first terminal apparatus through the sixth resource.

In some embodiments, the third SCI includes a seventh field, and the seventh field indicates whether third information exists and/or a manner of obtaining the third information; or the fourth SCI includes an eighth field, and the eighth field indicates whether third information exists and/or a manner of obtaining the third information.

The third information is for determining the second resource, and the third information includes at least one of a sending period of first data, a priority of the first data, a data packet size of the first data, or a delay condition of the first data. A manner of obtaining the sending period of the first data includes: The sending period is indicated by the third SCI, is indicated by the fourth SCI, is configured by the higher layer, or is carried by a MAC-CE. A manner of obtaining the priority of the first data includes: The priority is indicated by the third SCI, is indicated by the fourth SCI, is configured by the higher layer, or is carried by a MAC-CE. A manner of obtaining the data packet size of the first data includes: The data packet size is indicated by the fourth SCI, is implicitly indicated by the fourth resource, is configured by the higher layer, or is carried by a MAC-CE. A manner of obtaining the delay condition of the first data includes: The delay condition is indicated by the fourth SCI, is configured by the higher layer, or is carried by a MAC-CE.

In some embodiments, in response to the fourth SCI including the eighth field, the third SCI further includes a ninth field, and the ninth field indicates that the fourth SCI includes the eighth field.

In some embodiments, the processing module is configured to:

determine the second resource based on the third information through the detection of the SCI from the at least one fourth terminal apparatus.

For technical effects or the optional implementations, refer to the descriptions of the technical effects or the corresponding implementations.

In some embodiments, a communication apparatus is provided. The communication apparatus is, for example, the first communication apparatus described above. The communication apparatus includes a processor and a communication interface. The communication interface is configured to communicate with another apparatus or device. Optionally, the communication apparatus further includes a memory, configured to store computer instructions. The processor and the memory are coupled to each other, to implement the method according to some embodiments. Alternatively, the first communication apparatus is unable to include a memory, and the memory is located outside the first communication apparatus. The processor, the memory, and the communication interface are coupled to each other, to implement the method according to some embodiments. For example, in response to the processor executing the computer instructions stored in the memory, the first communication apparatus is enabled to perform the method according some embodiments. For example, the first communication apparatus is a communication device, or is a chip or another component configured in the communication device. For example, the communication device is a terminal device. For example, the first communication apparatus is a first terminal apparatus. The first terminal apparatus is a terminal device, or is a chip or another component configured in the terminal device.

In response to the first communication apparatus being a communication device, the communication interface is implemented by, for example, a transceiver (or a transmitter and a receiver) in the communication device. For example, the transceiver is implemented by an antenna, a feeder, and a codec in the communication device. Alternatively, in response to the first communication apparatus being a chip configured in a communication device, the communication interface is, for example, an input/output interface such as an input/output pin of the chip. The communication interface is connected to a radio frequency transceiver component in the communication device, to send and receive information through the radio frequency transceiver component.

In some embodiments, a communication apparatus is provided. The communication apparatus is, for example, the second communication apparatus described above. The communication apparatus includes a processor and a communication interface. The communication interface is configured to communicate with another apparatus or device. Optionally, the communication apparatus further includes a memory, configured to store computer instructions. The processor and the memory are coupled to each other, to implement the method according some embodiments. Alternatively, the second communication apparatus is unable to include a memory, and the memory is located outside the second communication apparatus. The processor, the memory, and the communication interface are coupled to each other, to implement the method according to some embodiments. For example, in response to the processor executing the computer instructions stored in the memory, the second communication apparatus is enabled to perform the method according to some embodiments. For example, the second communication apparatus is a communication device, or is a chip or another component configured in the communication device. For example, the communication device is a terminal device. For example, the second communication apparatus is a third terminal apparatus. The third terminal apparatus is a terminal device, or is a chip or another component configured in the terminal device.

In response to the second communication apparatus being a communication device, the communication interface is implemented by, for example, a transceiver (or a transmitter and a receiver) in the communication device. For example, the transceiver is implemented by an antenna, a feeder, and a codec in the communication device. Alternatively, in response to the second communication apparatus being a chip configured in a communication device, the communication interface is, for example, an input/output interface such as an input/output pin of the chip. The communication interface is connected to a radio frequency transceiver component in the communication device, to send and receive information through the radio frequency transceiver component.

In some embodiments, a chip is provided. The chip includes a processor and a communication interface. The processor is coupled to the communication interface, and is configured to implement the method according to some embodiments.

Optionally, the chip further includes a memory. For example, the processor reads and executes a software program stored in the memory, to implement the method according to some embodiments. Alternatively, the memory is unable to be included in the chip, but is located outside the chip. This is equivalent to that the processor reads and executes a software program stored in an external memory, to implement the method according to some embodiments.

In some embodiments, a chip is provided. The chip includes a processor and a communication interface. The processor is coupled to the communication interface, and is configured to implement the method according to some embodiments.

Optionally, the chip further includes a memory. For example, the processor reads and executes a software program stored in the memory, to implement the method according to some embodiments. Alternatively, the memory is unable to be included in the chip, but is located outside the chip. This is equivalent to that the processor reads and executes a software program stored in an external memory, to implement the method according to any one of the second aspect or some embodiments.

Some embodiments provide a first communication system. The communication system includes the communication apparatus according to some embodiments.

Some embodiments provide a second communication system. The communication system includes the communication apparatus according to some embodiments.

Some embodiments provide a computer-readable storage medium. The computer-readable storage medium is configured to store a computer program. In response to the computer program being run on a computer, the computer is enabled to perform the method according to some embodiments.

Some embodiments provide a computer-readable storage medium. The computer-readable storage medium is configured to store a computer program. In response to the computer program being run on a computer, the computer is enabled to perform the method according to any one of the second aspect or some embodiments.

Some embodiments a computer program product including instructions. The computer program product is configured to store a computer program. In response to the computer program being run on a computer, the computer is enabled to perform the method according to any one of the first aspect or some embodiments.

Some embodiments provide a computer program product including instructions. The computer program product is configured to store a computer program. In response to the computer program being run on a computer, the computer is enabled to perform the method according to any one of the second aspect or some embodiments.

DESCRIPTION OF EMBODIMENTS

Figure 1:
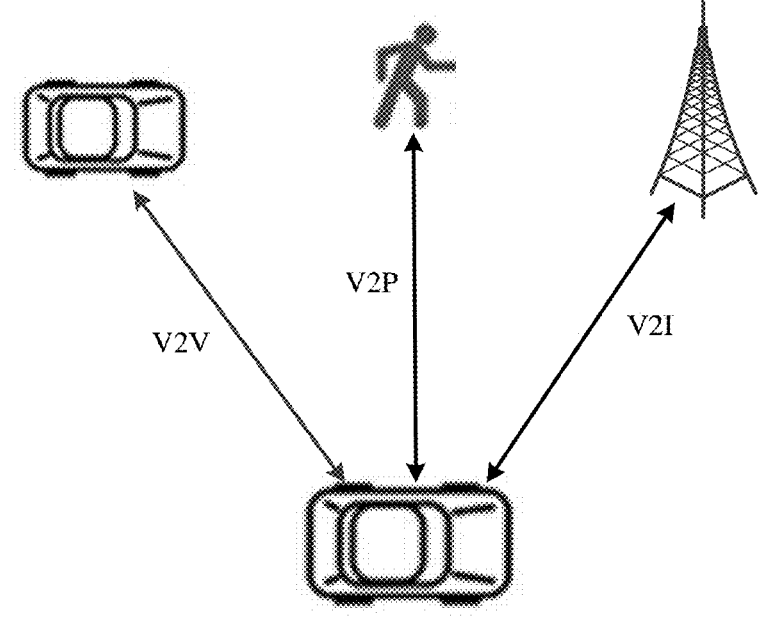
FIG. 1 is a schematic diagram of several V2X application scenarios in accordance with some embodiments.

To make objectives, technical solutions, and advantages of embodiments clearer, the following further describes embodiments in detail with reference to the accompanying drawings.

The following describes some terms in embodiments, to help a person skilled in the art have a better understanding.

(1) A terminal apparatus is, for example, a terminal device or a module, for example, a chip system, configured to implement a function of the terminal device, where the chip system is configured in the terminal device. The terminal device includes a device that provides a voice and/or data connectivity for a user. Specifically, the terminal device includes a device that provides a voice for a user, includes a device that provides data connectivity for a user, or includes a device that provides a voice and data connectivity for a user. For example, the terminal device includes a handheld device having a wireless connection function or a processing device connected to a wireless modem. The terminal device communicates with a core network through a radio access network (radio access network, RAN), and exchange a voice or data with the RAN, or exchange a voice and data with the RAN. The terminal device includes user equipment (user equipment, UE), a wireless terminal device, a mobile terminal device, a device-to-device (device-to-device, D2D) terminal device, a vehicle-to-everything (vehicle-to-everything, V2X) terminal device, a machine-to-machine/machine type communication (machine-to-machine/machine type communication, M2M/MTC) terminal device, an internet of things (internet of things, IoT) terminal device, light UE (light UE), a subscriber unit (subscriber unit), a subscriber station (subscriber station), a mobile station (mobile station), a remote station (remote station), an access point (access point, AP), a remote terminal (remote terminal), an access terminal (access terminal), a user terminal (user terminal), a user agent (user agent), a user device (user device), or the like. For example, the terminal device includes a mobile phone (or referred to as a "cellular" phone), a computer having a mobile terminal device, or a portable, pocket-sized, handheld, or computer built-in mobile apparatus, for example, a personal communications service (personal communications service, PCS) phone, a cordless telephone set, a session initiation protocol (session initiation protocol, SIP) phone, a wireless local loop (wireless local loop, WLL) station, or a personal digital assistant (personal digital assistant, PDA). The terminal device further includes a limited device, for example, a device with low power consumption, a device with a limited storage capability, or a device with a limited computing capability. For example, the terminal device includes an information sensing device, for example, a barcode, radio frequency identification (radio frequency identification, RFID), a sensor, a global positioning system (global positioning system, GPS), or a laser scanner.

By way of example and not limitation, the terminal device in some embodiments alternatively is a wearable device. The wearable device further is referred to as a wearable intelligent device, an intelligent wearable device, or the like, and is a general term of wearable devices, such as glasses, gloves, watches, clothes, and shoes, that are developed by applying wearable technologies to intelligent designs of daily wear. The wearable device is a portable device that is directly worn on the body or integrated into clothes or an accessory of a user. The wearable device is a hardware device, but further implements powerful functions through software support, data exchange, and cloud interaction. In a broad sense, wearable intelligent devices include full-featured and large-sized devices that implements all or a part of functions without depending on smartphones, for example, smart watches or smart glasses, and include devices that focus on one type of application function and want to collaboratively operate with other devices such as smartphones, for example, various smart bands, smart helmets, or smart jewelry for monitoring physical signs.

In response to the terminal devices described above being located in a vehicle (for example, placed in the vehicle or mounted in the vehicle), the terminal devices are considered as vehicle-mounted terminal devices. For example, the vehicle-mounted terminal devices are further referred to as on-board units (on-board units, OBUs).

In some embodiments, the terminal device further includes a relay (relay). Alternatively, any device that performs data communication with a base station is considered as a terminal device.

In some embodiments, an apparatus configured to implement functions of a terminal device is a terminal device, or is an apparatus, for example, a chip system, that supports the terminal device to implementing the functions. The apparatus is mounted in the terminal device. In some embodiments, the chip system includes a chip, or includes a chip and another discrete component. In the technical solutions provided in some embodiments, the technical solutions provided in some embodiments are described by using an example in which the terminal device is the apparatus for implementing the functions of the terminal.

(2) A network device includes, for example, an access network (access network, AN) device such as a base station (for example, an access point), and is a device that is in an access network and that communicates with a wireless terminal device over an air interface through one or more cells. Alternatively, for example, a network device in a vehicle-to-everything (vehicle-to-everything, V2X) technology is a road side unit (road side unit, RSU). The base station is configured to perform mutual conversion between a received over-the-air frame and an IP packet, and serves as a router between a terminal device and a remaining part of the access network, where the remaining part of the access network includes an IP network. The RSU is a fixed infrastructure entity supporting a V2X application, and exchanges a message with another entity supporting the V2X application. The network device further coordinates attribute management of an air interface. For example, the network device includes an evolved NodeB (NodeB, eNB, or e-NodeB, evolved NodeB) in a long term evolution (long term evolution, LTE) system or a long term evolution-advanced (long term evolution-advanced, LTE-A) system, includes a next generation NodeB (next generation NodeB, gNB) in a $5^{th}$ generation mobile communication technology ($5^{th}$ generation, 5G) new radio (new radio, NR) system (further an NR system for short), or includes a central-ized unit (centralized unit, CU) and a distributed unit (distributed unit, DU) in a cloud radio access network (cloud radio access network, Cloud RAN) system. This is not limited in some embodiments.

The network device further includes a core network device. The core network device includes, for example, an access and mobility management function (access and mobility management function, AMF) or a user plane func-tion (user plane function, UPF).

Because some embodiments relate to the access network device, the network device in the following is an access network device unless otherwise specified.

In some embodiments, an apparatus configured to imple-ment functions of the network device is a network device, or is an apparatus, for example, a chip system, that supports the network device to implement the functions. The apparatus is mounted in the network device. In the technical solutions provided in some embodiments, the technical solutions provided in some embodiments are described by using an example in which the network device is the apparatus for implementing the functions of the network device.

(3) V2X refers to interconnection between a vehicle and the outside, and is a technology of future intelligent vehicles, autonomous driving, and intelligent transpor-tation systems. In the V2X, a V2X application condi-tion is to be optimized based on an existing device-to-device (device-to-device, D2D) technology, to further reduce an access delay of a V2X device and resolve a resource conflict problem.

The V2X further includes several application conditions such as vehicle-to-vehicle (vehicle-to-vehicle, V2V), vehicle-to-infrastructure (vehicle-to-infrastructure, V2I), and vehicle-to-pedestrian (vehicle-to-pedestrian, V2P) direct communication, and vehicle-to-network (vehicle-to-network, V2N) communication interaction. As shown in FIG. 1, V2V refers to communication between vehicles, V2P refers to communication between a vehicle and a person (including a pedestrian, a bicycle rider, a driver, or a passenger), and V2I refers to communication between a vehicle and a network device, for example, an RSU. In addition, V2N is included in the V2I, and refers to commu-nication between a vehicle and a base station/a network.

The V2P is for giving safety warnings to pedestrians or non-motor vehicles on a road. A vehicle communicates, through the V2I, with a road or even other infrastructures such as a traffic light or a barricade, to obtain road manage-ment information such as a traffic light signal time sequence. The V2V is for information exchange and reminding between vehicles, and is most typically applied to a safety system for preventing a collision between vehicles. Cur-rently, the V2N is a most widely used vehicle-to-everything form, and a main function of the V2N is to enable a vehicle to connect to a cloud server through a mobile network, to use application functions such as navigation, entertainment, or anti-theft provided by the cloud server.

In the V2X, communication is performed between termi-nal devices. For a mode of transmission between the termi-nal devices, a current standard protocol supports a broadcast manner, a multicast manner, and a unicast manner.

Broadcast manner: The broadcast manner means that a terminal device used as a transmit end sends data in a broadcast mode, and a plurality of terminal devices receive sidelink control information (sidelink control information, SCI) or a sidelink shared channel (sidelink shared channel, SSCH) from the transmit end.

On a sidelink, a manner of ensuring that the terminal devices parse control information from the transmit end is: The transmit end does not scramble the control information, or scrambles the control information by using a scrambling code known to the terminal devices.

Multicast manner: The multicast manner is similar to the broadcast manner. A terminal device used as a transmit end sends data in a broadcast mode, and a group of terminal devices parse SCI or an SSCH.

Unicast manner: In the unicast manner, one terminal device sends data to another terminal device, and a remain-ing terminal device does not want to or is unable to parse the data.

(4) A resource reservation field is a field other than a reserved (reserved) field in 1st-stage SCI in an existing release. For example, the resource reservation field is a frequency resource assignment (frequency resource assignment) field in the 1st-stage SCI in the existing release, is a time resource assignment (time resource assignment) field in the 1st-stage SCI in the existing release, or is a frequency domain resource assignment field and a time domain resource assignment field in the 1st-stage SCI in the existing release. The 1st-stage SCI in the existing release is 1st-stage SCI in the 3rd generation partnership project (3rd generation partner-ship project, 3GPP) release 16 (release 16).

(5) Terms "system" and "network" is used interchange-ably in some embodiments. "At least one" means one or more, and "a plurality of" means two or more. The term "and/or" describes an association relationship between associated objects and represents that three relationships exists. For example, A and/or B represents the following cases: A exists, both A and B exist, and B exists, where A and B is singular or plural. The character "I" generally indicates an "or" relationship between associated objects. "At least one (one piece) of the following" or a similar expression thereof refers to any combination of these items, including any combi-nation of singular items (pieces) or plural items (pieces). For example, at least one of a, b, or c is configured to indicate: a, b, c, a and b, a and c, b and c, or a, b, and c, where a, b, and c is singular or plural.

In addition, unless otherwise stated on the contrary, ordinal terms such as "first" and "second" mentioned in some embodiments are for distinguishing between a plurality of objects, and are not intended to limit sizes, content, a sequence, a time sequence, priorities, importance degrees, or the like of the plurality of objects. For example, a first time-frequency resource and a second time-frequency resource are for distinguishing between different time-frequency resources, but do not indicate a difference in sizes, priorities, importance degrees, or the like of the two time-frequency resources.

The foregoing describes some noun concepts in some embodiments. The following describes technical features in some embodiments.

With development of wireless communication technologies, people have increasing demands for a high data rate and user experience, and have increasing demands for a proximity service for knowing people or things around and communicating with these people or things. Therefore, a D2D technology emerges. Application of the D2D technology alleviates burdens of a cellular network, reduce battery power consumption of UE, improve a data rate, and well meet the demand for the proximity service. The D2D technology allows a plurality of terminal apparatuses that support a D2D function to perform direct discovery and direct communication regardless of whether there is a network infrastructure. In view of features and advantages of the D2D technology, a vehicle-to-everything application scenario based on the D2D technology is proposed. However, considering security, a delay condition is quite high in this scenario, and is unable to be met by using the existing D2D technology.

Therefore, a V2X technology is proposed based on a network that uses an LTE technology and that is proposed by the 3rd generation partnership project (the 3rd generation partnership project, 3GPP). V2X communication is communication between a vehicle and anything outside, and includes V2V communication, V2P communication, V2I communication, and V2N communication, as shown in FIG. 1. The V2X communication is intended for high-speed devices represented by vehicles, and is a technology used in scenarios, for example, intelligent vehicles, autonomous driving, or intelligent transportation systems, with a very high communication delay condition. LTE V2X communication supports communication scenarios with network coverage and communication scenarios without network coverage, and a resource allocation mode in the LTE V2X communication is a network access device scheduling mode, for example, an evolved universal terrestrial radio access network NodeB (E-UTRAN NodeB, eNB) scheduling mode, and a UE autonomous-selection mode. Based on a V2X technology, vehicle UE (vehicle UE, V-UE for short) sends, to surrounding V-UE, some information of the vehicle UE, for example, information such as a position, a speed, or an intention (turning, paralleling, or reversing) that is periodically sent and information triggered by some aperiodic events. Similarly, the V-UE further receives information from other V-UE around in real time.

LTE V2X meets some conditions in V2X scenarios. However, the existing LTE V2X is unable to effectively support application scenarios such as fully intelligent driving or autonomous driving in the future. With development of 5G NR technologies in the 3GPP standards organization, NR V2X further develops. For example, the NR V2X supports a shorter transmission delay, more reliable communication transmission, a higher throughput, and better user experience, to meet wider application scenario conditions.

In a V2X communication process, UE communicates with other UE through a sidelink. For example, transmit-end UE (which further is referred to as a transmit-end terminal apparatus) sends sidelink data and sidelink control information (sidelink control information, SCI) to receive-end UE (which further is referred to as a receive-end terminal apparatus) through a sidelink. In the NR V2X, there are two sidelink resource allocation modes for the transmit-end terminal apparatus: a mode in which a base station allocates a resource (which further is referred to as a resource allocation mode-1) and a mode in which UE autonomously selects a resource (which further is referred to as a resource allocation mode-2).

The mode-1 is applied to V2X communication in a case with network coverage. In the mode-1, the base station centrally performs resource allocation based on a BSR reporting status of UE. The mode-1 is a dynamic mode or a preconfiguration mode. In the mode-1 as the dynamic mode, the base station dynamically schedules, by using downlink control information (downlink control information, DCI), a time-frequency resource used by the transmit-end terminal apparatus to send sidelink data. After receiving the DCI, the transmit-end terminal apparatus sends the sidelink data to the receive-end terminal apparatus on the dynamically scheduled time-frequency resource. In the mode-1 as the preconfiguration mode, the base station configures, by using higher layer signaling, a time-frequency resource used by the transmit-end terminal apparatus to send sidelink data. The transmit-end terminal apparatus directly sends the sidelink data to the receive-end terminal apparatus on the time-frequency resource configured by using the higher layer signaling. Alternatively, the base station sends one piece of DCI to activate the time-frequency resource configured by using the higher layer signaling, so that the transmit-end terminal apparatus sends the sidelink data to the receive-end terminal apparatus on the activated time-frequency resource configured by using the higher layer signaling.

In the mode-2, the transmit-end terminal apparatus selects a time-frequency resource without relying on a base station. The mode-2 is not limited by the network coverage. In response to there being no network coverage, the transmit-end terminal apparatus further performs communication in this mode. In the mode-2, a sensing result is obtained in a resource sensing window $[n-t_0,n-t_{proc,0})$ described by using a slot range. $t_0$ is a boundary value of the resource sensing window. For example, $t_0$ is 1100 ms or 100 ms, or is another value. Using a 15 kHz subcarrier spacing as an example, $t_0$=1100 slots or 100 slots. Alternatively, using a 60 kHz subcarrier spacing as an example, $t_0$=4400 slots or 400 slots. $t_{proc,0}$ is a time period for which the transmit-end terminal apparatus processes the sensing result, and a value of $t_{proc,0}$ varies with a capability of the terminal apparatus, where $t_{proc,0} \geq 0$.

Figure 2:
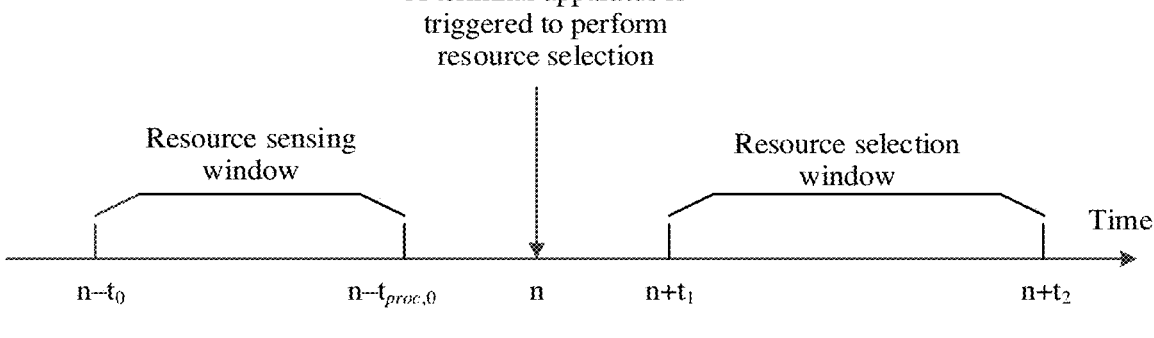
FIG. 2 is a schematic diagram of a resource sensing window and a resource selection window that are used in response to a terminal device performing resource selection in accordance with some embodiments.

The transmit-end terminal apparatus excludes, based on the sensing result, an unavailable time-frequency resource from a resource selection window $[n+t_1,n+t_2]$ described by using the slot range, so that the transmit-end terminal apparatus obtains a time-frequency resource available to send the sidelink data. $0 \leq t_1 \leq t_{proc,1}$, $t_{proc,1}$ is a receive/transmit transition time period of the terminal apparatus, and a value of $t_{proc,1}$ varies with the capability of the terminal apparatus. $t_{2\_min} < t_2 \leq a$ remaining packet delay budget (packet delay budget, PDB), where the remaining PDB is a parameter that is in a unit of a slot and that is for measuring a delay of a to-be-sent data packet, or is an absolute time period, for example, in a unit of milliseconds (ms). For the resource sensing window and the resource selection window, refer to illustration in FIG. 2.

A resource selection manner of the transmit-end terminal apparatus is described as follows:

1. The transmit-end terminal apparatus receives SCI from another terminal apparatus in a resource pool in the resource sensing window $[n-t_0, n-t_{proc,0})$, where the SCI includes resource reservation information of the another terminal apparatus. Further, the SCI is 1st-stage SCI (1st-stage SCI), and is sent on a physical sidelink control channel (physical sidelink control channel, PSCCH).

One piece of SCI is for scheduling a maximum of three transmissions. For example, in the three transmissions, the first transmission is an initial transmission, and the last two transmissions are retransmissions. Alternatively, the three transmissions are retransmissions. Alternatively, the three transmissions are initial transmissions. This is not limited in some embodiments. The resource reservation information included in the SCI includes time-frequency resource information for scheduled data in the second and the third transmissions, periodic time-frequency resource information reflecting a data service period, data priority information (a priority of a PSSCH), or the like. At a given moment, one terminal device sends one piece of SCI to reserve a resource (including a time-frequency resource) located after the moment and for data retransmission and new periodic data transmission.

2. In response to the SCI being sensed by the transmit-end terminal apparatus includes a resource that has been reserved by the another terminal apparatus, and the reserved resource is located in the resource selection window $[n+t_1, n+t_2]$, the transmit-end terminal apparatus measures a demodulation reference signal (demodulation reference signal, DMRS) for data or a control channel sent on the reserved resource, to obtain reference signal received power (reference signal received power, RSRP). In response to the RSRP being obtained through measurement is greater than a preset RSRP threshold $Th_{RSRP}$, the transmit-end terminal apparatus excludes the resource from the resource selection window. The preset RSRP threshold $Th_{RSRP}$ is obtained based on a function between a priority corresponding to data and indicated in the SCI received by the transmit-end terminal apparatus and a priority corresponding to data to be sent by the transmit-end terminal apparatus. In response to a quantity of remaining resources being in the resource selection window is less than a preset value, the preset RSRP threshold $Th_{RSRP}$ is increased, for example, increased by 3 dB.

3. After excluding the unavailable resource from the resource selection window, the transmit-end terminal apparatus selects, from one or more remaining available resources in the resource selection window, a resource to carry the to-be-sent data.

Currently, a resource used by the transmit-end terminal apparatus to send data is selected based on the sensing result of the transmit-end terminal apparatus in the resource sensing window $[n-t_0, n-t_{proc,0})$ This technical solution depends on the sensing result of the transmit-end terminal apparatus. In response to signal attenuation between the transmit-end terminal apparatus and another transmit-end terminal apparatus being severe, the transmit-end terminal apparatus fails to sense a resource reservation status of the another transmit-end terminal apparatus, and consequently selects a same resource as the another transmit-end terminal apparatus did. In this case, strong interference is caused by sidelink communication of the another transmit-end terminal apparatus to the transmit-end terminal apparatus. This results in poor signal receiving quality of a receive-end terminal apparatus or even a receiving failure.

Figure 3:
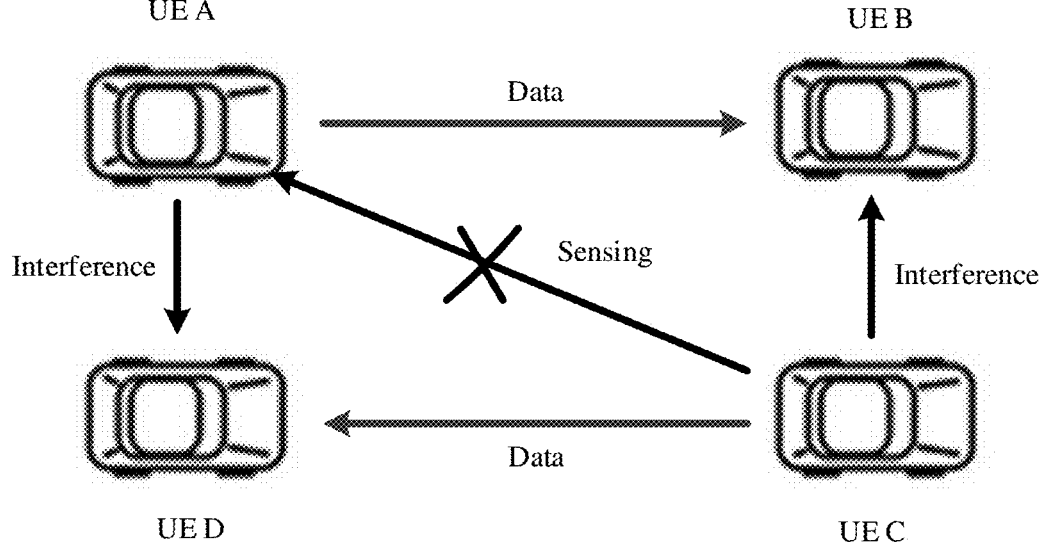
FIG. 3 is a schematic diagram of a receiving failure caused because a transmit-end terminal device does not consider a status of a receive-end terminal device during data sending in accordance with some embodiments.

For example, FIG. 3 is a schematic diagram of a sidelink communication scenario in accordance with some embodiments. As shown in FIG. 3, UE A and UE B are a transmission pair, the UE A is transmit-end UE, and the UE B is receive-end UE. UE C and UE D are a transmission pair, the UE C is transmit-end UE, and the UE D is receive-end UE. The UE A selects a resource from a resource selection window based on a sensing result of the UE A, to send data to the UE B. Because a distance between the UE A and the UE C is long, signal attenuation between the UE A and the UE C is severe, the UE A fails to receive SCI from the UE C during sensing, and consequently does not exclude, from the resource selection window, a resource that has been occupied by the UE C. The UE A selects a same resource as the UE C did. This causes a resource collision. Actually, the UE C sends data to the UE D. Because the UE B is close to the UE C, sidelink communication between the UE C and the UE D causes strong interference to receiving the data from the UE A by the UE B. Consequently, the UE B is unable to correctly decode the data from the UE A. Similarly, the UE A sends the data to the UE B. Because the UE A is close to the UE D, sidelink communication between the UE A and the UE B further causes strong interference to receiving the data from the UE C by the UE D. Consequently, the UE D is unable to correctly decode the data from the UE C.

Figure 4:
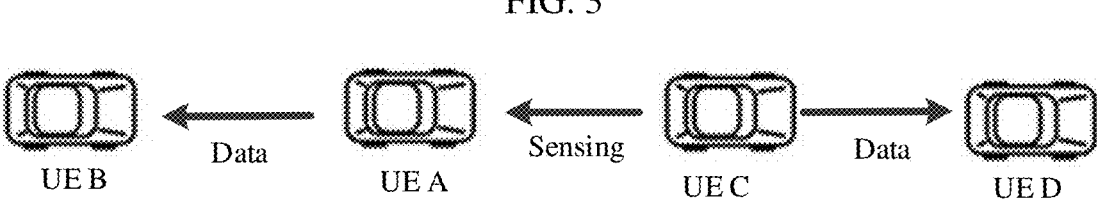
FIG. 4 is a schematic diagram of excessive resource exclusion caused because a transmit-end terminal device does not consider a status of a receive-end terminal device during data sending in accordance with some embodiments.

For another example, FIG. 4 is another schematic diagram of a sidelink communication scenario in accordance with some embodiments. As shown in FIG. 4, UE A and UE B are a transmission pair, the UE A is transmit-end UE, and the UE B is receive-end UE. UE C and UE D are a transmission pair, the UE C is transmit-end UE, and the UE D is receive-end UE. The UE A selects a resource from a resource selection window based on a sensing result of the UE A, to send data to the UE B. Because a distance between the UE A and the UE C is short, signal attenuation between the UE A and the UE C is slight, the UE A successfully receives SCI from the UE C during sensing, and excludes, from the resource selection window, a resource that has been occupied by the UE C. Therefore, no resource collision is caused. However, actually, the UE C sends data to the UE D. Because the UE B is far away from the UE C, sidelink communication between the UE C and the UE D does not cause interference to receiving the data from the UE A by the UE B. Similarly, the UE A sends the data to the UE B. Because the UE A is far away from the UE D, sidelink communication between the UE A and the UE B does not cause interference to receiving the data from the UE C by the UE D. In this case, the UE A reuses the resource for the UE C. However, because the UE A excludes the resource for the UE C in response to performing resource selection based on the sensing result of the UE A, some available resources are considered as unavailable resources, resource exclusion is excessive, resulting in a resource waste.

In view of this, some embodiments provide a communication method. In the method, a first terminal apparatus serving as a data transmit end sends first information to a third terminal apparatus, to trigger the third terminal apparatus to send second information to the first terminal apparatus, where the second information indicates a second resource. In response to selecting a resource for sending data, the first terminal apparatus is configured to use the second resource as a reference resource. The first terminal apparatus selects, based on a sensing result of the first terminal apparatus but further the second resource indicated by the third terminal apparatus as the reference resource, the resource for sending the data. Because the second resource is determined by the third terminal apparatus based on a sensing result of the third terminal apparatus, and indicates a degree of interference caused by another terminal apparatus to the third terminal apparatus, the first terminal apparatus selects an appropriate resource based on the sensing result of the third terminal apparatus and the sensing result of the first terminal apparatus to send the data, to reduce interference, a resource conflict caused by selecting a resource the same as that of another terminal apparatus, and a resource waste caused by failing in appropriate use of a reusable resource due to excessive exclusion.

The technical solutions provided in some embodiments are applied to D2D scenarios such as an NR D2D scenario or an LTE D2D scenario, or is applied to V2X scenarios such as an NR V2X scenario or an LTE V2X scenario. For example, the technical solutions are applied to internets of vehicles such as V2X, LTE-V, or V2V, or is applied to fields such as intelligent driving or intelligent connected vehicles. Alternatively, the technical solutions are applied to other scenarios or other communication systems, for example, is applied to resource selection over a Uu interface in an LTE system or an NR system. This is not limited.

Figure 5:
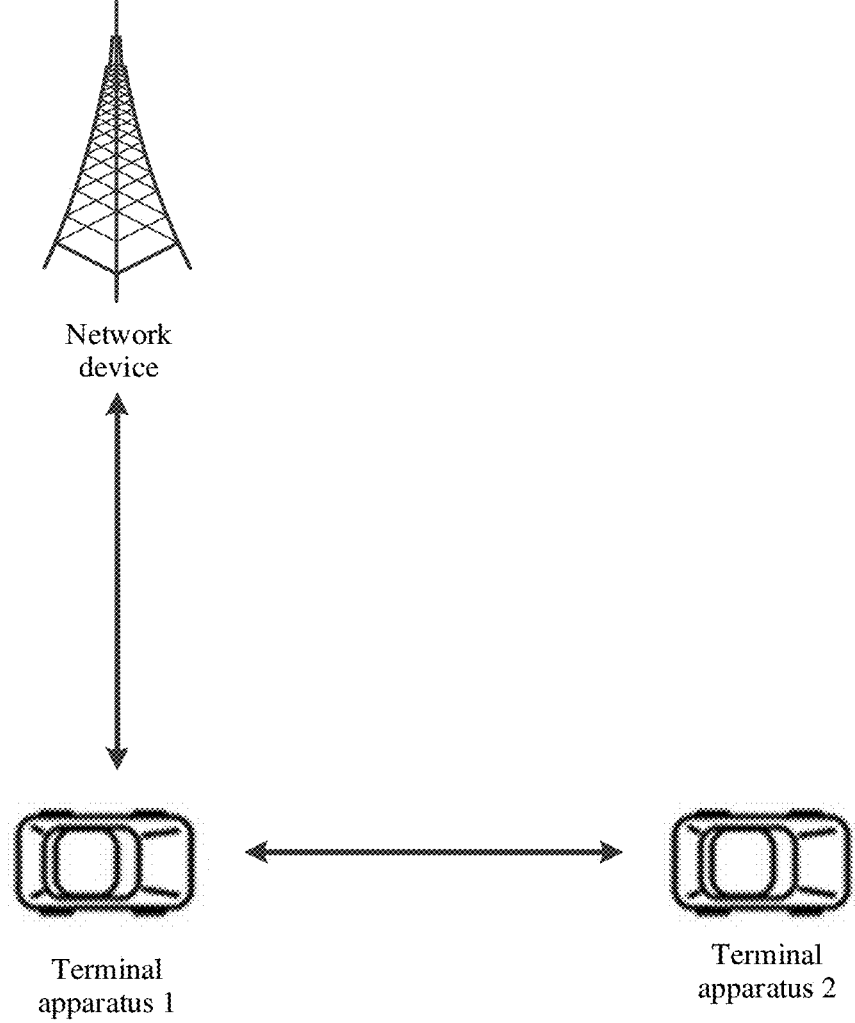
FIG. 5 is a schematic diagram of an application scenario in accordance with some embodiments.

The following describes a network architecture to which some embodiments are applied. FIG. 5 shows the network architecture to which some embodiments are applied.

As shown in FIG. 5, a communication system 500 includes a network device and terminal apparatuses (where FIG. 5 includes two terminal apparatuses: a terminal apparatus 1 and a terminal apparatus 2). Both the terminal apparatus 1 and the terminal apparatus 2 is located within coverage of the network device. Alternatively, the terminal apparatus 1 in the two terminal apparatuses are located within coverage of the network device, and the terminal apparatus 2 is not located within the coverage of the network device. Alternatively, neither of the two terminal apparatuses is located within coverage of the network device. The two terminal apparatuses communicates with each other through a sidelink. FIG. 5 uses an example in which the terminal apparatus 1 is located in the coverage of the network device but the terminal apparatus 2 is not located in the coverage of the network device. Certainly, a quantity of terminal apparatuses in FIG. 5 is an example. During application, the network device serves a plurality of terminal apparatuses.

For example, the network device in FIG. 5 is an access network device such as a base station. The access network device corresponds to different devices in different systems. For example, the access network device corresponds to an eNB in a 4th generation mobile communication technology (4th generation, 4G) system and correspond to a 5G access network device, for example, a gNB, in a 5G system, or is an access network device in a subsequent evolved communication system.

For example, the terminal apparatus in FIG. 5 is a vehicle-mounted terminal device or a vehicle. However, the terminal apparatus in some embodiments is not limited thereto.

With reference to the accompanying drawings, the following describes the technical solutions provided in some embodiments.

Figure 6:
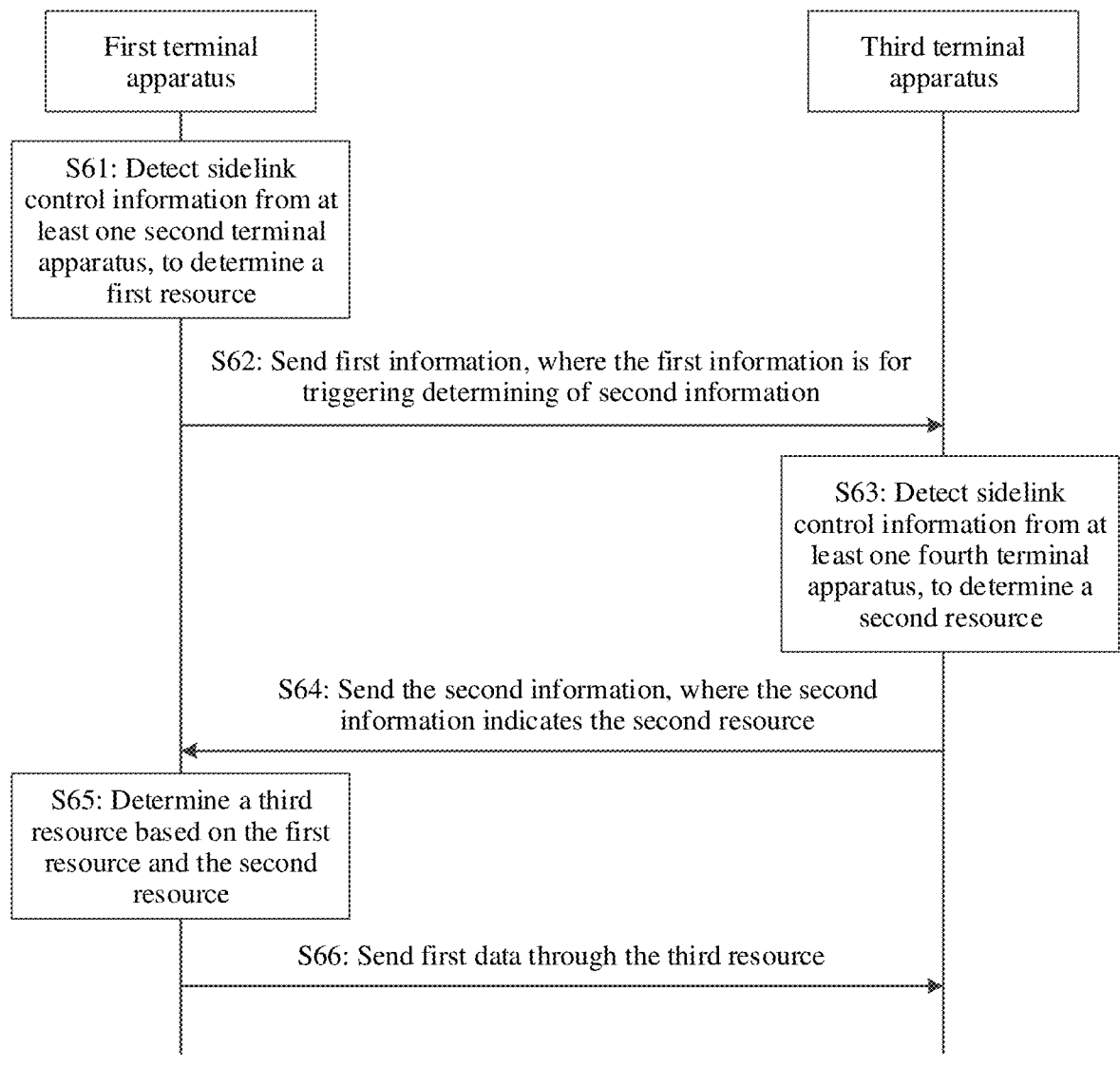
FIG. 6 is a flowchart of a communication method in accordance with some embodiments.

FIG. 6 is a flowchart of a communication method in accordance with some embodiments. In the following description process, an example in which the method is applied to the network architecture shown in FIG. 5 is used.

For ease of description, the following uses an example in which the method is performed by a first terminal apparatus and a third terminal apparatus. Because this embodiment uses an example in which the method is applied to the network architecture shown in FIG. 5, the first terminal apparatus described below is the terminal apparatus 1 in the network architecture shown in FIG. 5, or is a chip or a chip system configured in the terminal apparatus 1; and the third terminal apparatus described below is the terminal apparatus 2 in the network architecture shown in FIG. 5, or is a chip or a chip system configured in the terminal apparatus 2.

S61: The first terminal apparatus detects (or referred to as "senses") SCI from at least one second terminal apparatus, to determine a first resource.

Within network coverage, a network device configures sidelink (sidelink, SL) resource pool (resource pool) information for a terminal apparatus in a local cell by using a system information block (system information block, SIB), cell-specific (cell-specific) RRC signaling, or UE-specific (UE-specific) RRC signaling. Without the network coverage, the terminal apparatus selects a time-frequency resource by using SL resource pool information preconfigured at delivery of the device. The SL resource pool information indicates an SL resource pool. The terminal apparatus selects the time-frequency resource from the SL resource pool to perform SL communication with another terminal apparatus. A communication process includes one or more of unicast communication, multicast communication, or broadcast communication. The SL resource pool includes one or more time units in time domain. One time unit is one symbol (symbol), several symbols, one slot, one subframe (subframe), or the like. One or more time units included in one SL resource pool in time domain is consecutive or discrete in physical time. The SL resource pool includes one or more frequency domain units in frequency domain. One frequency domain unit is one resource block (resource block, RB), several RBs, one sub-channel (sub-channel), or the like. One sub-channel includes one or more RBs.

In response to the first terminal apparatus wanting to send data to the third terminal apparatus, and for example, the data is first data, the first terminal apparatus performs sensing in a slot n, to select a resource to carry the data. Alternatively, in response to the first terminal apparatus wanting to send control information to the third terminal apparatus, the first terminal apparatus performs sensing in a slot n, to select a resource to carry the control information. Alternatively, in response to the first terminal apparatus wanting to send data and control information to the third terminal apparatus, the first terminal apparatus performs sensing in a slot n, to select a resource to carry the data and the control information. The resource includes a time domain resource, include a frequency domain resource, or include a time domain resource and a frequency domain resource.

Some embodiments use an example in which the first terminal apparatus sends the first data to the third terminal apparatus, but the control information and/or the data is actually sent. The third terminal apparatus is a terminal apparatus that receives first information, or is unable to be a terminal apparatus that receives first information. The at least one second terminal apparatus includes the third terminal apparatus. That the at least one second terminal apparatus includes the third terminal apparatus is intended to emphasize existence of another terminal apparatus. Therefore, the third terminal apparatus is alternatively unable to be included herein.

In S61, the first terminal apparatus receives the SCI from the at least one second terminal apparatus in a resource pool in a resource sensing window $[n-t_0, n-t_{proc,0})$, to determine the first resource, where the SCI includes resource reservation information of the at least one second terminal apparatus. The first resource includes a resource unavailable to send the data to the third terminal apparatus, or the first resource includes a resource available to send the data to the third terminal apparatus. For example, in response to the SCI sensed by the first terminal apparatus including a resource that has been reserved by the at least one second terminal apparatus, and the reserved resource is located in a resource selection window $[n+t_1, n+t_2]$, the first resource is the reserved resource. The first terminal apparatus wants to exclude the first resource from the resource selection window $[n+t_1, n+t_2]$, and select, from one or more remaining resources, a resource for sending the data to the third terminal apparatus. For another example, in response to the SCI sensed by the first terminal apparatus including a resource that has been reserved by the at least one second terminal apparatus, and the reserved resource is located in a resource selection window $[n+t_1, n+t_2]$, the first terminal apparatus excludes the reserved resource from the resource selection window $[n+t_1, n+t_2]$, and the first resource is a resource that remains after the reserved resource is excluded, so that the first terminal apparatus selects, from the first resource, a resource for sending the data to the third terminal apparatus. Some embodiments is described by using an example in which the first resource includes the resource unavailable to send the data to the third terminal apparatus. For a resource selection process performed by the first terminal apparatus, refer to the foregoing descriptions. Details are not described herein again.

S62: The first terminal apparatus sends the first information to the third terminal apparatus, where the first information is for triggering determining of second information. The third terminal apparatus receives the first information.

Before sending the first data to the third terminal apparatus, the first terminal apparatus first triggers the third terminal apparatus to perform a resource assistance procedure, trigger the third terminal apparatus to send the second information to the first terminal apparatus. The second information further is referred to as assistance information (assistance information). The following provides descriptions by using an example in which the second information is the assistance information. Therefore, the first terminal apparatus first sends the first information to the third terminal apparatus, to trigger the third terminal apparatus to send the assistance information to the first terminal apparatus, so that the first terminal apparatus selects, based on the assistance information, the resource for sending the data to the third terminal apparatus. The first information further is referred to as trigger information (trigger information). The following provides descriptions by using an example in which the first information is the trigger information. Specifically, the first terminal apparatus selects a fifth resource from the resource selection window $[n+t_1, n+t_2]$ based on the sensed SCI of the at least one second terminal apparatus, so that the first terminal apparatus sends the first information to the third terminal apparatus through the fifth resource.

For example, a time domain position of the fifth resource is n', where $t_1 \le n' < t_2$. The first terminal apparatus wants to first send the trigger information to the third terminal apparatus, receive the assistance information from the third terminal apparatus, and then send the first data to the third terminal apparatus. In other words, n' is before a moment of sending the first data. in response to a terminal apparatus sending data to another terminal apparatus, the sending terminal apparatus wants to be ensured that the data is sent within a remaining packet delay budget (remaining packet delay budget); otherwise, the data is considered as failed to be sent. Therefore, to ensure that the first data is sent within the remaining packet delay budget, smaller n' is better. For example, the first terminal apparatus determines one or more available resources based on a sensing result, and the fifth resource is or is unable to be a resource earliest in time domain in the one or more available resources, provided that $t_1 \le n' < t_2$ is satisfied.

In response to sending sidelink information, a terminal apparatus usually sends 1st-stage SCI (1st-stage SCI) and 2nd-stage SCI (2nd-stage SCI), and further sends data (data). This is understood as: In response to sending the sidelink information, the terminal apparatus sends control information (the 1st-stage SCI and the 2nd-stage SCI), sends the data, or sends the 1st-stage SCI, the 2nd-stage SCI, and the data. The 1st-stage SCI is sent, for example, on a control channel, and the 2nd-stage SCI is sent, for example, on a data channel. The 1st-stage SCI is for scheduling the 2nd-stage SCI and the data. The 2nd-stage SCI is further for scheduling the data. For example, the 2nd-stage SCI includes at least a source ID (source ID), the control channel is, for example, a physical sidelink control channel (physical sidelink control channel, PSCCH), and the data channel is, for example, a physical sidelink shared channel (physical sidelink shared channel, PSSCH). In addition, the 1st-stage SCI is configured to indicate a resource for sending the 2nd-stage SCI, where the indication includes indicating bit rate information for determining the 2nd-stage SCI. In this case, the first terminal apparatus sends the trigger information to the third terminal apparatus via one of the two pieces of SCI, or sends the trigger information to the third terminal apparatus via the data. The 1st-stage SCI is usually broadcast information, and terminal apparatuses want to receive and decode the 1st-stage SCI. Specifically, for a terminal apparatus that wants to perform sensing and that is used by a user to perform autonomous resource selection, the 1st-stage SCI includes control information for the sensing and the autonomous resource selection by the user, for example, includes one or more of resource reservation information, time-frequency resource information, priority information, or periodic time-frequency resource information reflecting a data service period. The 2nd-stage SCI is in different formats. For example, the 2nd-stage SCI includes different control information fields for different transmissions such as geographical location-based multicast. Therefore, control information called for by terminal apparatuses supporting different standard releases or terminal apparatuses supporting different functions are carried in the 2nd-stage SCI, and the 1st-stage SCI is common information called for by terminal apparatuses (for example, including one or more types of the terminal apparatuses supporting different standard releases (for example, a 3rd generation partnership project (3rd generation partnership project, 3GPP) Rel-16 terminal apparatus and a 3GPP Rel-17 terminal apparatus), terminal apparatuses supporting the geographical location-based multicast, or terminal apparatuses supporting resource assistance), and includes the control information for the sensing and the autonomous resource selection by the user. In this case, the terminal apparatuses coexists in one resource pool, as resource exclusion is performed based on the 1st-stage SCI and the terminal apparatuses excludes unavailable resources by detecting the 1st-stage SCI. This reduces a resource conflict probability and improves resource utilization.

Therefore, in an example, the first terminal apparatus sends the trigger information to the third terminal apparatus via the 1st-stage SCI. For example, the first terminal apparatus sends second control information to the third terminal apparatus, where the second control information includes third SCI and fourth SCI, the third SCI is 1st-stage SCI, the fourth SCI is 2nd-stage SCI, and the third SCI includes the trigger information. Because the 1st-stage SCI is sent in a broadcast manner, by parsing the 1st-stage SCI, a terminal apparatus that receives the third SCI is triggered to obtain the second resource, so that the first terminal apparatus performs resource exclusion based on the second resource. For another example, the first terminal apparatus reuses an existing field in the 1st-stage SCI to indicate the trigger information. For example, the existing field is a resource reservation field in the 1st-stage SCI. Reusing the existing field to indicate the trigger information reduces a change to SCI in an existing release. Alternatively, the first terminal apparatus is configured to use a reserved field in the 1st-stage SCI to indicate the trigger information. As the trigger information is indicated by using the reserved field, SCI in an existing release is compatible with.

In an example, the first terminal apparatus sends the trigger information to the third terminal apparatus via the 2nd-stage SCI. For example, the first terminal apparatus sends second control information to the third terminal apparatus, where the second control information includes third SCI and fourth SCI, the third SCI is 1st-stage SCI, the fourth SCI is 2nd-stage SCI, and the fourth SCI includes the trigger information. For example, the first terminal apparatus adds a new field to the 2nd-stage SCI to indicate the trigger information. Because the 2nd-stage SCI is usually unicast or multicast information sent to one terminal apparatus, a terminal apparatus that receives the fourth SCI successfully parses the 2nd-stage SCI to be triggered to obtain the second resource, so that the first terminal apparatus performs resource exclusion based on the second resource.

In another example, the first terminal apparatus sends the trigger information to the third terminal apparatus via the 2nd-stage SCI, and use one field in the 1st-stage SCI to indicate that the 2nd-stage SCI includes the trigger information. For example, the first terminal apparatus sends second control information to the third terminal apparatus, where the second control information includes third SCI and fourth SCI, the third SCI is 1st-stage SCI, the fourth SCI is 2nd-stage SCI, the fourth SCI includes the trigger information, the third SCI includes a third field, and the third field indicates that the fourth SCI includes the trigger information. Because the 1st-stage SCI is sent in a broadcast manner, a terminal apparatus that receives the third SCI parses the third field in the 1st-stage SCI, and parses the fourth SCI based on the third field, to be triggered to obtain the second resource, so that the first terminal apparatus performs resource exclusion based on the second resource. Optionally, the third field is a reserved field in the 1st-stage SCI, so that SCI in an existing release is compatible with.

After sending the trigger information to the third terminal apparatus, the first terminal apparatus triggers the third terminal apparatus to send the assistance information to the first terminal apparatus. This involves a fact that the third terminal apparatus wants to determine a resource for sending the assistance information. The first terminal apparatus is configured to indicate a fourth resource to the third terminal apparatus based on the sensing result, where the fourth resource is used by the third terminal apparatus to determine the resource for sending the assistance information. Because the fourth resource is selected by the first terminal apparatus based on the sensing result of the first terminal apparatus, and the fourth resource reflects a status of interference, to data receiving by the first terminal apparatus, that is caused in response to another terminal apparatus sending data, the third terminal apparatus selects the resource based on the fourth resource to send the assistance information to the first terminal apparatus, to avoid interference, to receiving the assistance information by the first terminal apparatus, that is caused in response to another terminal apparatus sending the data. This improves a success rate of receiving the assistance information by the first terminal apparatus.

The fourth resource is an available resource determined by the first terminal apparatus based on the sensing result. In this case, the fourth resource is understood as a recommended resource, and that interference caused by the another terminal apparatus to receiving data on the fourth resource by the first terminal apparatus meets a receiving condition, receiving reliability is achieved; in other words, that interference caused by the another terminal apparatus to receiving data on the fourth resource by the first terminal apparatus is slight. Therefore, the first terminal apparatus recommends the third terminal apparatus to send the assistance information to the first terminal apparatus through the fourth resource. Alternatively, the fourth resource is an unavailable resource determined by the first terminal apparatus based on the sensing result, and that interference caused by the another terminal apparatus to receiving data on the fourth resource by the first terminal apparatus is unable to meet a receiving condition, receiving reliability is unable to be achieved; in other words, that interference caused by the another terminal apparatus to receiving data on the fourth resource by the first terminal apparatus is strong.

In an example, the third SCI includes a fourth field, and the fourth field indicates whether the fourth resource exists, indicates a manner of obtaining the fourth resource, or indicates both whether the fourth resource exists and a manner of obtaining the fourth resource in response to the fourth resource existing. Because the 1st-stage SCI is sent in the broadcast manner, the terminal apparatus that receives the third SCI determines, by parsing the 1st-stage SCI, whether the first terminal apparatus indicates the fourth resource and/or the manner of obtaining the fourth resource. For example, whether the fourth resource exists is indicated by one bit. In response to the bit being 0, the fourth resource does not exist. In response to the bit being 1, the fourth resource exists. For another example, the fourth resource is configured by a higher layer, and the third terminal apparatus obtains the fourth resource by using higher layer signaling sent by the first terminal apparatus. In this case, the first terminal apparatus wants to use the fourth field in the 1st-stage SCI to indicate whether the first terminal apparatus is to send the higher layer signaling including the fourth resource to the third terminal apparatus. In response to the fourth field indicating that the higher layer signaling including the fourth resource is not to be sent to the third terminal apparatus, the fourth resource does not exist; or in response to the fourth field indicating that the higher layer signaling including the fourth resource is to be sent to the third terminal apparatus, the fourth resource exists, and the third terminal apparatus obtains the fourth resource by using the higher layer signaling from the first terminal apparatus, to select the resource for sending the assistance information. For example, the first terminal apparatus is to indicate the fourth resource to the third terminal apparatus. In this case, the first terminal apparatus wants to use the fourth field in the 1st-stage SCI to indicate the manner of obtaining the fourth resource, so that the third terminal apparatus parses the fourth field to obtain the fourth resource. For another example, the first terminal apparatus is directly configured to use the fourth field in the 1st-stage SCI to indicate whether the fourth resource exists and indicate the manner of obtaining the fourth resource in response to the fourth resource existing. Optionally, the fourth field is a reserved field in the third SCI, so that 1st-stage SCI in an existing release is compatible with.

The manner of obtaining the fourth resource includes but is not limited to: The fourth resource is indicated by the third SCI, is indicated by the fourth SCI, is configured by the higher layer, or is carried by a media access control (media access control, MAC) control element (control element, CE). For example, the manner of obtaining the fourth resource is indicated by two bits, to respectively indicate the foregoing four cases. That the fourth resource is indicated by the third SCI means: The first terminal apparatus is configured to indicate the fourth resource by using a resource reservation field in the 1st-stage SCI, and the third terminal apparatus parses the resource reservation field to obtain the fourth resource. Reusing a reserved resource in the 1st-stage SCI to indicate the fourth resource reduces a change to a structure of the 1st-stage SCI in the existing release. Alternatively, the first terminal apparatus is configured to indicate the fourth resource by using a reserved field in the 1st-stage SCI, and the third terminal apparatus parses the reserved field to obtain the fourth resource. Indicating the fourth resource by using a reserved field in the 1st-stage SCI makes the 1st-stage SCI in the existing release compatible with. That the fourth resource is indicated by the fourth SCI means: The first terminal apparatus is configured to indicate the fourth resource by using a newly added field (for example, a newly added field with $N \geq 1$ bits) in the 2nd-stage SCI, and the third terminal apparatus parses the newly added field to obtain the fourth resource. Indicating the fourth resource by using the newly added field in the 2nd-stage SCI makes the SCI in the existing release compatible with. That the fourth resource is configured by the higher layer means: The fourth resource is configured by the network device for the third terminal apparatus. Specifically, a configured higher-layer parameter is sent to the third terminal apparatus by using RRC dedicated signaling, a SIB message, or the like. Alternatively, the fourth resource is preconfigured at delivery of the third terminal apparatus. Alternatively, the first terminal apparatus sends PC5 RRC dedicated signaling to the third terminal apparatus, where the signaling includes the fourth resource, so that the third terminal apparatus obtains the fourth resource from the signaling sent by the first terminal apparatus. That the fourth resource is carried by a MAC-CE means: The first terminal apparatus sends the fourth resource to the third terminal apparatus via the MAC-CE, and the third terminal apparatus obtains the fourth resource via the MAC-CE.

In an example, the fourth SCI includes a fifth field, and the fifth field indicates whether the fourth resource exists, indicates a manner of obtaining the fourth resource, or indicates both whether the fourth resource exists and a manner of obtaining the fourth resource in response to the fourth resource existing. For example, whether the fourth resource exists is indicated by one bit. In response to the bit being 0, the fourth resource does not exist. In response to the bit being 1, the fourth resource exists. For another example, the fourth resource is configured by a higher layer, and the third terminal apparatus obtains the fourth resource by using higher layer signaling sent by the first terminal apparatus. In this case, the first terminal apparatus wants to use the fifth field in the 2nd-stage SCI to indicate whether the first terminal apparatus is to send the higher layer signaling including the fourth resource to the third terminal apparatus. In response to the fifth field indicating that the higher layer signaling including the fourth resource is not to be sent to the third terminal apparatus, the fourth resource does not exist; or in response to the fifth field indicating that the higher layer signaling including the fourth resource is to be sent to the third terminal apparatus, the fourth resource exists, and the third terminal apparatus obtains the fourth resource by using the higher layer signaling from the first terminal apparatus, to select the resource for sending the assistance information. For example, the first terminal apparatus is to indicate the fourth resource to the third terminal apparatus. In this case, the first terminal apparatus wants to use the fifth field in the 2nd-stage SCI to indicate the manner of obtaining the fourth resource, so that the third terminal apparatus parses the fifth field to obtain the fourth resource. For another example, the first terminal apparatus is directly configured to use the fifth field in the 2nd-stage SCI to indicate whether the fourth resource exists and indicate the manner of obtaining the fourth resource in response to the fourth resource existing. Optionally, the fifth field is a newly added field in the fourth SCI, so that the SCI in the existing release is compatible with. The manner of obtaining the fourth resource is as described above, and details are not described herein again.

In another example, in response to the fourth SCI including the fifth field, the third SCI further includes a sixth field, and the sixth field indicates that the fourth SCI includes the fifth field. For example, the first terminal apparatus is configured to use the sixth field in the 1st-stage SCI to indicate which field in the 2nd-stage SCI is the fifth field, so that after parsing the 1st-stage SCI, the third terminal apparatus directly parses the fifth field in the 2nd-stage SCI based on content indicated by the sixth field, to determine whether the first terminal apparatus indicates the fourth resource and/or the manner of obtaining the fourth resource. Optionally, the sixth field is a reserved field in the third SCI, so that the 1st-stage SCI in the existing release is compatible with. The manner of obtaining the fourth resource is as described above, and details are not described herein again.

In some embodiments, in response to indicating whether the fourth resource exists and the manner of obtaining the fourth resource in response to the fourth resource existing, the first terminal apparatus is configured to use one field (namely, the fourth field) in the 1st-stage SCI to indicate both whether the fourth resource exists and the manner of obtaining the fourth resource in response to the fourth resource existing; use two fields in the 1st-stage SCI to respectively indicate whether the fourth resource exists and the manner of obtaining the fourth resource in response to the fourth resource existing; use one field in the 1st-stage SCI to indicate whether the fourth resource exists, and use one field in the 2nd-stage SCI to indicate the manner of obtaining the fourth resource in response to the fourth resource existing; use one field in the 2nd-stage SCI to indicate whether the fourth resource exists, and use one field in the 1st-stage SCI to indicate the manner of obtaining the fourth resource in response to the fourth resource existing; use one field (namely, the fifth field) in the 2nd-stage SCI to indicate both whether the fourth resource exists and the manner of obtaining the fourth resource in response to the fourth resource existing; or use two fields in the 2nd-stage SCI to respectively indicate whether the fourth resource exists and the manner of obtaining the fourth resource in response to the fourth resource existing.

Figure 7:
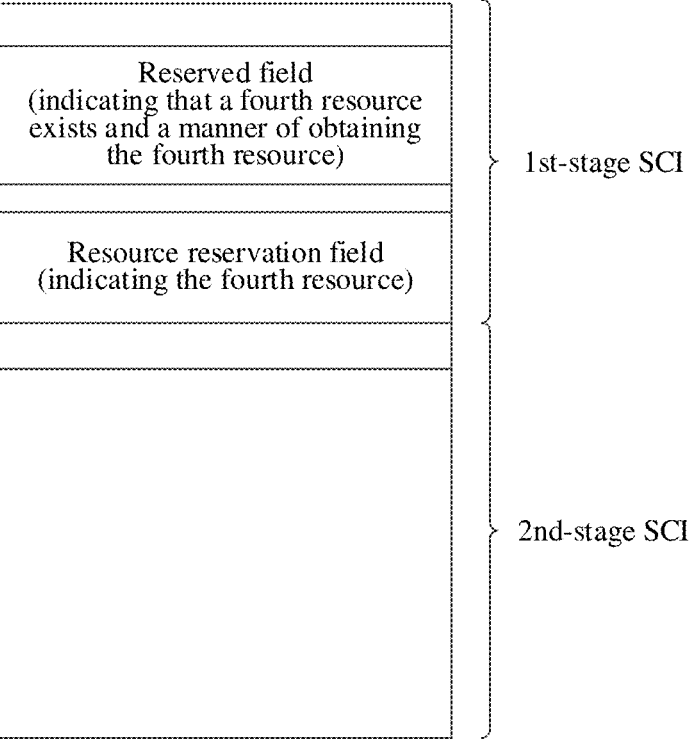
FIG. 7 is a schematic diagram of a structure of second control information in accordance with some embodiments.
Figures 8, 9:
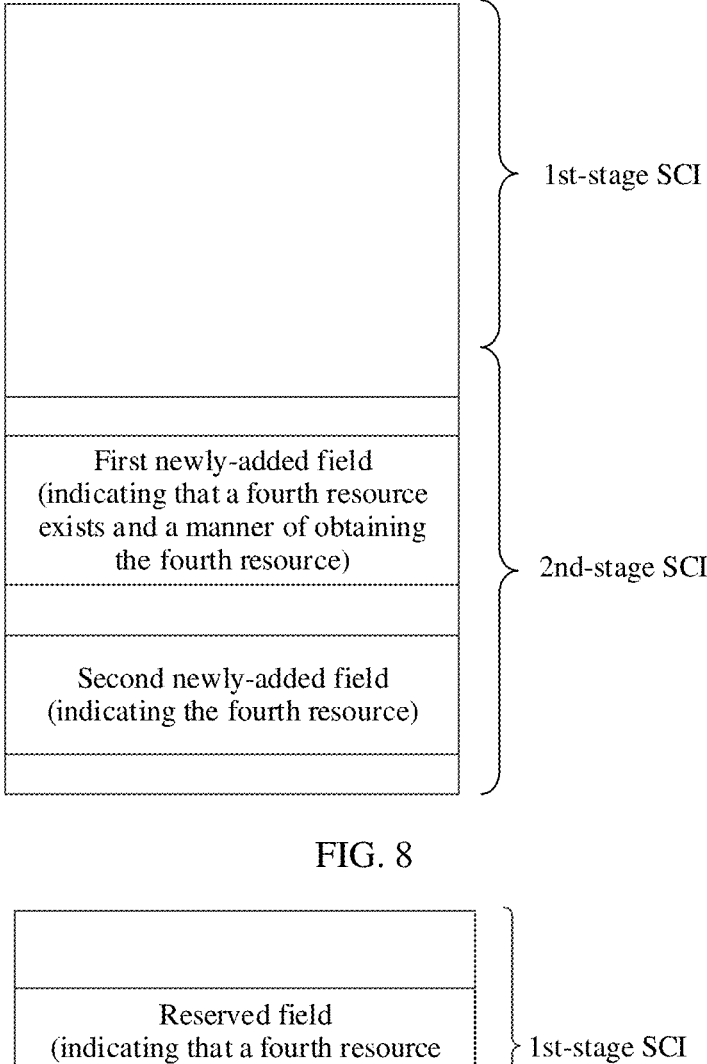
FIG. 8 is another schematic diagram of a structure of second control information in accordance with some embodiments.
FIG. 9 is another schematic diagram of a structure of second control information in accordance with some embodiments.

For example, the first terminal apparatus is configured to use a reserved field in the 1st-stage SCI to indicate that the fourth resource exists and the manner of obtaining the fourth resource, for example, indicate that the third terminal apparatus obtains the fourth resource by parsing the resource reservation field in the 1st-stage SCI, so that the third terminal apparatus successfully obtains the fourth resource to determine the resource for sending the assistance information, as shown in FIG. 7. For example, the first terminal apparatus is configured to use a first newly-added field in the 2nd-stage SCI to indicate that the fourth resource exists and the manner of obtaining the fourth resource, for example, indicate that the third terminal apparatus obtains the fourth resource by using a second newly-added field in the 2nd-stage SCI, so that the third terminal apparatus successfully obtains the fourth resource to determine the resource for sending the assistance information, as shown in FIG. 8. For another example, the first terminal apparatus is configured to use a reserved field in the 1st-stage SCI to indicate the fourth resource, and use a newly added field in the 2nd-stage SCI to indicate the manner of obtaining the fourth resource, for example, indicate that the third terminal apparatus obtains the fourth resource through higher layer configuration, so that the third terminal apparatus successfully obtains the fourth resource to determine the resource for sending the assistance information, as shown in FIG. 9. Another structure of the second control information is obtained through a corresponding change to structures shown in FIG. 7 to FIG. 9, and examples are not enumerated one by one herein.

Whether the fourth resource exists alternatively is obtained through higher layer configuration. Specifically, the configured higher-layer parameter is sent to the third terminal apparatus by using the RRC dedicated signaling, the SIB message, or the like. Alternatively, the fourth resource is preconfigured at delivery of the third terminal apparatus. Alternatively, the first terminal apparatus sends the PC5 RRC dedicated signaling to the third terminal apparatus, so that the fourth resource is obtained.

The first terminal apparatus sends the trigger information to the third terminal apparatus to trigger the third terminal apparatus to obtain the second resource. The first terminal apparatus is further configured to indicate third information to the third terminal apparatus, where the third information is for determining the second resource, so that the third terminal apparatus selects an appropriate second resource based on the third information. The third information includes at least one of a sending period of the first data, a priority of the first data, a data packet size of the first data, or a delay condition of the first data. The following describes the third information and a manner of obtaining the third information.

1. Sending period of the first data: A manner of obtaining the sending period of the first data includes but is not limited to: The sending period is indicated by the third SCI, is indicated by the fourth SCI, is configured by the higher layer, or is carried by a MAC-CE. For example, the first terminal apparatus reuses a period field in the 1st-stage SCI to indicate the sending period of the first data, or is configured to use a reserved field in the 1st-stage SCI to indicate the sending period of the first data. In response to the first terminal apparatus reuses the period field in the 1st-stage SCI to indicate the sending period of the first data, the first terminal apparatus is configured to use a reserved field in the 1st-stage SCI or add a new field to the 2nd-stage SCI to indicate that the period field in the 1st-stage SCI indicates the sending period of the first data. For example, the first terminal apparatus adds a new field to the 2nd-stage SCI to indicate the sending period of the first data. For another example, the sending period of the first data alternatively is configured by the higher layer. Specifically, RRC dedicated signaling, a SIB message, a preconfiguration manner, or the like is used. The third terminal apparatus determines the sending period of the first data based on a parameter configured by the higher layer. For another example, the sending period of the first data alternatively is sent via the MAC CE. A selection range of the sending period of the first data is configured by the higher layer. For example, the selection range is a part or of {0, 1-99, 100, 200, 300, 400, 500, 600, 700, 800, 900, 1000} ms. The third terminal apparatus performs sensing based on the sending period of the first data, to perform resource exclusion and/or resource selection. For example, the third terminal apparatus determines, based on the sending period of the first data, whether a corresponding reserved resource wants to be excluded, to determine the second resource.

2. Priority of the first data: A manner of obtaining the priority of the first data includes but is not limited to: The priority is indicated by the third SCI, is indicated by the fourth SCI, is configured by the higher layer, or is carried by a MAC-CE. For example, the first terminal apparatus reuses a priority field in the 1st-stage SCI to indicate the priority of the first data, or is configured to use a reserved field in the 1st-stage SCI to indicate the selected priority of the first data. In response to the first terminal apparatus reuses the priority field in the 1st-stage SCI to indicate the sending period of the first data, the first terminal apparatus is configured to use a reserved field in the 1st-stage SCI or add a new field to the 2nd-stage SCI to indicate that the priority field in the 1st-stage SCI indicates the priority of the first data. For another example, the first terminal apparatus adds a new field to the 2nd-stage SCI to indicate the selected priority of the first data. For another example, the selected priority of the first data is configured by the higher layer. Specifically, RRC dedicated signaling, a SIB message, a preconfiguration manner, or the like is used, so that the third terminal apparatus determines the selected priority of the first data based on a parameter configured by the higher layer. For another example, the priority of the first data alternatively is sent via the MAC CE. The third terminal apparatus determines a measurement threshold based on the priority of the first data and a priority indicated in sensed SCI sent by other UE, where the measurement threshold is for excluding a reserved resource of the other UE, to determine the second resource.

3. Data packet size of the first data: The data packet size of the first data includes but is not limited to a size of a sub-channel occupied by the first data, namely, a quantity of sub-channels occupied by the first data. For example, the quantity of sub-channels occupied by the first data is denoted as $L_{sub}$. For example, the third terminal apparatus performs resource exclusion based on a sensing result and the size of the sub-channel occupied by a PSSCH carrying the first data. Therefore, the first terminal apparatus notifies the third terminal apparatus of information about the size of the sub-channel occupied by the first data. For another example, the data packet size of the first data includes a transport block (transport block, TB) size (size) corresponding to the first data, and the third terminal apparatus performs resource exclusion based on the TB size. Alternatively, the data packet size of the first data includes other information. A manner of obtaining the data packet size of the first data includes: The data packet size is indicated by the third SCI, is implicitly indicated by the fourth resource, is configured by the higher layer, or is carried by a MAC-CE. For example, the first terminal apparatus adds a new field to the 2nd-stage SCI to indicate the data packet size of the first data. For example, the first terminal apparatus is configured to use the fourth resource to implicitly indicate the data packet size of the first data. For example, a quantity of sub-channels included in the fourth resource is equal to the quantity of sub-channels that the first data wants to occupy. For another example, the data packet size of the first data is configured by the higher layer. Specifically, RRC dedicated signaling, a SIB message, a preconfiguration manner, or the like is used, so that the third terminal apparatus determines the data packet size of the first data based on a parameter configured by the higher layer. For another example, the data packet size of the first data alternatively is sent via the MAC-CE, and the third terminal apparatus determines the data packet size of the first data via the MAC-CE. The third terminal apparatus recommends an appropriate resource based on the data packet size of the first data. For example, a quantity of sub-channels included in the second resource is equal to the quantity of sub-channels that the first data wants to occupy. This avoids a resource waste caused by an excessively large recommended resource, and avoid a problem that the recommended resource is excessively small and is unable to carry the first data.

4. Delay condition of the first data: A manner of obtaining the delay condition of the first data includes but is not limited to: The delay condition is indicated by the fourth SCI, is configured by the higher layer, or is carried by a MAC-CE. For example, the first terminal apparatus adds a new field to the 2nd-stage SCI to indicate the delay condition of the first data, and the third terminal apparatus parses the 2nd-stage SCI to obtain the delay condition of the first data. For another example, the delay condition of the first data is configured by the higher layer. Specifically, RRC dedicated signaling, a SIB message, a preconfiguration manner, or the like is used. The third terminal apparatus determines the delay condition of the first data based on a parameter configured by the higher layer. For another example, the delay condition of the first data alternatively is sent via the MAC-CE, and the third terminal apparatus determines the delay condition of the first data via the MAC-CE. The delay condition of the first data is at least one of a PDB, or a start location, an end location, or a range of a resource selection window corresponding to the second resource. In response to the delay condition is the PDB, the third terminal apparatus determines, based on the delay condition, the range of the resource selection window for selecting the second resource.

In an example, the third SCI includes a seventh field, and the seventh field indicates whether the third information exists, indicates the manner of obtaining the third information, or indicates both whether the third information exists and the manner of obtaining the third information in response to the third information existing. For example, whether the third information exists is indicated by one bit. In response to the bit being 0, the third information does not exist. In response to the bit being 1, the third information exists. Because the 1st-stage SCI is sent in the broadcast manner, the terminal apparatus that receives the third SCI determines, by parsing the 1st-stage SCI, whether the first terminal apparatus indicates the third information and/or the manner of obtaining the third information. For another example, the third information is configured by the higher layer, and the third terminal apparatus obtains the third information by using higher layer signaling sent by the first terminal apparatus. In this case, the first terminal apparatus wants to use the seventh field in the 1st-stage SCI to indicate whether the first terminal apparatus is to send the higher layer signaling including the third information to the third terminal apparatus. In response to the seventh field indicating that the higher layer signaling including the third information is not to be sent to the third terminal apparatus, the third information does not exist; or in response to the seventh field indicating that the higher layer signaling including the third information is to be sent to the third terminal apparatus, the third information exists, and the third terminal apparatus obtains the third information by using the higher layer signaling from the first terminal apparatus, to determine the second resource. For example, the first terminal apparatus is to indicate the third information to the third terminal apparatus. In this case, the first terminal apparatus wants to use the seventh field in the 1st-stage SCI to indicate the manner of obtaining the third information, so that the third terminal apparatus parses the seventh field to obtain the third information. For another example, the first terminal apparatus is directly configured to use the seventh field in the 1st-stage SCI to indicate whether the third information exists and indicate the manner of obtaining the third information in response to the third information existing. Optionally, the seventh field is a reserved field in the third SCI, so that the 1st-stage SCI in the existing release is compatible with.

In an example, the fourth SCI includes an eighth field, and the eighth field indicates whether the third information exists, indicates the manner of obtaining the third information, or indicates both whether the third information exists and the manner of obtaining the third information in response to the third information existing. For example, whether the third information exists is indicated by one bit. In response to the bit being 0, the third information does not exist. In response to the bit being 1, the third information exists. For another example, the third information is configured by the higher layer, and the third terminal apparatus obtains the third information by using higher layer signaling sent by the first terminal apparatus. In this case, the first terminal apparatus wants to use the eighth field in the 2nd-stage SCI to indicate whether the first terminal apparatus is to send the higher layer signaling including the third information to the third terminal apparatus. In response to the eighth field indicating that the higher layer signaling including the third information is not to be sent to the third terminal apparatus, the third information does not exist; or in response to the eighth field indicating that the higher layer signaling including the third information is to be sent to the third terminal apparatus, the third information exists, and the third terminal apparatus obtains the third information by using the higher layer signaling from the first terminal apparatus, to determine the second resource. For example, the first terminal apparatus is to indicate the third information to the third terminal apparatus. In this case, the first terminal apparatus wants to use the eighth field in the 2nd-stage SCI to indicate the manner of obtaining the third information, so that the third terminal apparatus parses the eighth field to obtain the third information. For another example, the first terminal apparatus is directly configured to use the eighth field in the 2nd-stage SCI to indicate whether the third information exists and indicate the manner of obtaining the third information in response to the third information existing. Optionally, the eighth field is a newly added field in the fourth SCI, so that the SCI in the existing release is compatible with.

In another example, in response to the fourth SCI including the eighth field, the third SCI further includes a ninth field, and the ninth field indicates that the fourth SCI includes the eighth field. For example, the first terminal apparatus is configured to use the ninth field in the 1st-stage SCI to indicate which field in the 2nd-stage SCI is the eighth field, so that after parsing the 1st-stage SCI, the third terminal apparatus directly parses the eighth field in the 2nd-stage SCI based on content indicated by the ninth field, to determine whether the first terminal apparatus indicates the third information and/or the manner of obtaining the third information. Optionally, the ninth field is a reserved field in the third SCI, so that the 1st-stage SCI in the existing release is compatible with.

In some embodiments, in response to indicating whether the third information exists and the manner of obtaining the third information in response to the third information existing, the first terminal apparatus is configured to use one field (namely, the seventh field) in the 1st-stage SCI to indicate both whether the third information exists and the manner of obtaining the third information in response to the third information existing; use two fields in the 1st-stage SCI to respectively indicate whether the third information exists and the manner of obtaining the third information in response to the third information existing; use one field in the 1st-stage SCI to indicate whether the third information exists, and use one field in the 2nd-stage SCI to indicate the manner of obtaining the third information in response to the third information existing; use one field in the 2nd-stage SCI to indicate whether the third information exists, and use one field in the 1st-stage SCI to indicate the manner of obtaining the third information in response to the third information existing; use one field (namely, the eighth field) in the 2nd-stage SCI to indicate both whether the third information exists and the manner of obtaining the third information in response to the third information existing; or use two fields in the 2nd-stage SCI to respectively indicate whether the third information exists and the manner of obtaining the third information in response to the third information existing.

In some embodiments, the first terminal apparatus is configured to indicate the fourth resource to the third terminal apparatus, indicate the third information to the third terminal apparatus, or indicate the fourth resource and the third information to the third terminal apparatus. The first terminal apparatus is configured to use two fields in the third SCI to respectively indicate whether the fourth resource exists and/or the manner of obtaining the fourth resource (for example, by using the fifth field) and whether the third information exists and/or the manner of obtaining the third information (for example, by using the seventh field); use two fields in the fourth SCI to respectively indicate whether the fourth resource exists and/or the manner of obtaining the fourth resource (for example, by using the sixth field) and whether the third information exists and/or the manner of obtaining the third information (for example, by using the eighth field); use one field (for example, the fifth field) in the third SCI to indicate whether the fourth resource exists and/or the manner of obtaining the fourth resource, and use one field (for example, the eighth field) in the fourth SCI to indicate whether the third information exists and/or the manner of obtaining the third information; use one field (for example, the sixth field) in the fourth SCI to indicate whether the fourth resource exists and/or the manner of obtaining the fourth resource, and use one field (for example, the seventh field) in the third SCI to indicate whether the third information exists and/or the manner of obtaining the third information; use one field in the third SCI to indicate whether the fourth resource exists and/or the manner of obtaining the fourth resource and indicate whether the third information exists and/or the manner of obtaining the third information; or use one field in the fourth SCI to indicate whether the fourth resource exists and/or the manner of obtaining the fourth resource and indicate whether the third information exists and/or the manner of obtaining the third information.

For example, one reserved field in the third SCI indicates whether the fourth resource and/or the manner of obtaining the fourth resource and indicates whether the third information exists and/or the manner of obtaining the third information, and the reserved field includes four bits. In response to the reserved field being 0000, the reserved field is configured to indicate that neither the fourth resource nor the third information exists, the first terminal apparatus does not indicate the fourth resource or the third information to the third terminal apparatus. In response to the reserved field being 0001, the reserved field is configured to indicate that the fourth resource does not exist, the third information exists, and the sending period of the first data, the priority of the first data, the data packet size of the first data, and the delay condition of the first data are configured by the higher layer. For example, in response to the reserved field being 1000, the reserved field is configured to indicate that the fourth resource exists, the third information does not exist, and the fourth resource is indicated by the 1st-stage SCI. For another example, in response to the reserved field being 1100, the reserved field is configured to indicate that the fourth resource exists, the third information exists, the fourth resource is indicated by the 2nd-stage SCI, the sending period of the first data is indicated by the 1st-stage SCI, the priority of the first data is indicated by the 1st-stage SCI, and the data packet size of the first data is indicated by the 2nd-stage SCI. Another possible case is similar to the case herein, and examples are not enumerated one by one herein.

Whether the third information exists alternatively is obtained through higher layer configuration. Specifically, a configured higher-layer parameter is sent to the third terminal apparatus by using RRC dedicated signaling, a SIB message, or the like. Alternatively, the third information is preconfigured at delivery of the third terminal apparatus. Alternatively, the first terminal apparatus sends PC5 RRC dedicated signaling to the third terminal apparatus, so that the third information is obtained.

Optionally, the fourth SCI further includes one or more of the following information: a layer 1 (layer 1, L1) source identifier (source ID), an L1 destination identifier (destination ID), geographical location information of the first terminal apparatus, or communication range information. For example, the fourth SCI includes the L1 source identifier; the fourth SCI includes the L1 destination identifier; the fourth SCI includes the geographical location information of the first terminal apparatus; the fourth SCI includes the communication range information; the fourth SCI includes the L1 source identifier and the L1 destination identifier; the fourth SCI includes the L1 source identifier, the L1 destination identifier, and the geographical location information of the first terminal apparatus; the fourth SCI includes the L1 source identifier, the L1 destination identifier, the geographical location information of the first terminal apparatus, and the communication range information.

The L1 source identifier indicates the first terminal apparatus, and the L1 destination identifier indicates the third terminal apparatus. Alternatively, the L1 source identifier and the L1 destination identifier is configured to indicate the data (including but not limited to a service to which the data belongs) sent by the first terminal apparatus to the third terminal apparatus. In this case, the first terminal apparatus and the third terminal apparatus determines, based on the L1 source identifier and the L1 destination identifier, whether current communication is related to the first terminal apparatus and the third terminal apparatus.

The geographical location information of the first terminal apparatus is zone identification information (Zone ID) or other geographical location-related information, and is used to identify a geographical location of the first terminal apparatus. The communication range information indicates a communication range called for by control and/or the data sent by the first terminal apparatus.

In this case, after receiving and decoding the fourth SCI, the third terminal apparatus determines, based on the geographical location information of the first terminal apparatus and the communication range information, whether to respond to the control information, the data, and/or the like from the first terminal apparatus. For example, in response to the third terminal apparatus determining that the control information and/or the data from the first terminal apparatus do/does not meet a condition of the communication range information included in the fourth SCI (where for example, the communication range is 100 m), the third terminal apparatus is unable to respond to information (the control information and/or the data) from the first terminal apparatus, for example, does not send the assistance information to the first terminal apparatus; otherwise, the third terminal apparatus responds to the information (the control information and/or the data) from the first terminal apparatus, for example, send the assistance information to the first terminal apparatus. In response to the information from the first terminal apparatus not meeting the condition of the communication range information, the first terminal apparatus is far away from the third terminal apparatus. In this case, even in response to the third terminal apparatus sending the assistance information to the first terminal apparatus, the assistance information barely helps a sending process performed by the first terminal apparatus. Therefore, the third terminal apparatus is unable to want to send the assistance information to the first terminal apparatus. In this manner, signaling overheads are reduced.

To improve a success rate of sending the trigger information, In some embodiments, the trigger information is further repeatedly sent, the trigger information is further sent in a slot following n'. In response to the first terminal apparatus repeatedly sending the trigger information, a resource for repeatedly sending the trigger information is indicated by the third SCI, so that the third terminal apparatus correctly receives the repeatedly sent trigger information. For example, after sending the trigger information to the third terminal apparatus on the fifth resource, the first terminal apparatus further retransmits the trigger information to the third terminal apparatus on the fifth resource, where the third SCI is configured to indicate the fifth resource. Therefore, the third terminal apparatus receives the retransmitted trigger information from the first terminal apparatus on the fifth resource based on the indication by first SCI. In addition, a quantity of times the trigger information is repeatedly sent is not limited in some embodiments.

S63: The third terminal apparatus detects (or is referred to as "senses") SCI from at least one fourth terminal apparatus, to determine the second resource, where the second resource is for determining the resource used by the first terminal apparatus to send the data.

After receiving the trigger information, the third terminal apparatus wants to determine the assistance information to be sent to the first terminal apparatus. For example, in response to the third terminal apparatus receiving the trigger information in the slot n', the third terminal apparatus performs sensing, the third terminal apparatus detects the SCI from the at least one fourth terminal apparatus, to determine the second resource. For example, the third terminal apparatus receives the SCI from the at least one fourth terminal apparatus in a resource pool in a resource sensing window $[n'-t_0, n'-t_{proc,0})$, obtains a sensing result, and selects a resource in a resource selection window $$[n' + t'_1, n' + t'_2]$$

based on the sensing result, where $$t^1_{2min} \le t'_2 <$$

the remaining PDB. The second resource is a resource unavailable to send the data by the first terminal apparatus. For example, in response to the SCI being sensed by the third terminal apparatus includes a resource that has been reserved by the at least one fourth terminal apparatus, and the reserved resource is located in the resource selection window $$[n' + t'_1, n' + t'_2],$$

the second resource is the reserved resource. Alternatively, the second resource is a resource available to send the data by the first terminal apparatus. For example, in response to the SCI being sensed by the third terminal apparatus includes a resource that has been reserved by the at least one fourth terminal apparatus, and the reserved resource is located in the resource selection window $$[n' + t'_1, n' + t'_2],$$

the third terminal apparatus excludes the reserved resource from the resource selection window $$[n' + t'_1, n' + t'_2],$$

and the second resource is a resource that remains after the reserved resource is excluded. Some embodiments uses an example in which the second resource is the resource used by the first terminal apparatus to send the data to the third terminal apparatus. However, actually, the second resource is a resource used by the first terminal apparatus to send data to a terminal apparatus other than the third terminal apparatus. The at least one fourth terminal apparatus includes the first terminal apparatus. That the at least one fourth terminal apparatus includes the first terminal apparatus is intended to emphasize existence of another terminal apparatus. Therefore, the first terminal apparatus is alternatively unable to be included herein.

Optionally, in response to the first terminal apparatus indicating the third information to the third terminal apparatus, the third terminal apparatus selects the second resource from the resource selection window $$[n' + t_1', n' + t_2']$$

based on the third information. Because the third information is related to the data to be sent by the first terminal apparatus, the third terminal apparatus selects, based on the third information, the second resource recommended to the first terminal apparatus, so that the selected second resource meets a condition of the first terminal apparatus for sending the data. For determining, by the third terminal apparatus, whether the third information exists and/or how to obtain the third information, refer to the foregoing descriptions, and details are not described herein again.

S64: The third terminal apparatus sends the second information to the first terminal apparatus, where the second information indicates the second resource. The first terminal apparatus receives the second information.

After determining the second resource and before sending, to the first terminal apparatus, the assistance information that indicates the second resource, the third terminal apparatus further wants to determine the resource for sending the assistance information.

To ensure the delay condition of the first data sent by the first terminal apparatus to the third terminal apparatus, a slot in which the resource that is selected by the third terminal apparatus and that is for sending the assistance information is located wants to be before a slot $n+t_2$. The third terminal apparatus receives the trigger information from the first terminal apparatus in the slot n' to trigger resource selection. In this case, the third terminal apparatus performs resource sensing, detects the SCI from the at least one fourth terminal apparatus. In response to performing resource exclusion, the third terminal apparatus excludes a resource reserved by another terminal apparatus to send data, exclude a resource reserved by another terminal apparatus to send control information, or exclude a resource reserved by another terminal apparatus to send data and a resource reserved by another terminal apparatus to send control information. In response to the third terminal apparatus failing to receive the trigger information in the slot n', the third terminal apparatus receives the retransmitted trigger information from the first terminal apparatus in the slot n', and the third terminal apparatus is further triggered in the slot n' to perform resource sensing. In other words, each time the third terminal apparatus receives the trigger information, the third terminal apparatus is triggered to perform resource sensing. In response to the third terminal apparatus performing sensing for a plurality of times and sensing results are consistent, the resource exclusion and the like is performed based on the sensing results; or in response to the third terminal apparatus performing sensing for a plurality of times and sensing results are inconsistent, in response to the third terminal apparatus performing operations such as resource exclusion, a resource sensing process triggered by trigger information that is received for the latest time prevails.

For example, in response to the first terminal apparatus indicating the fourth resource, the third terminal apparatus determines, in the resource selection window $$[n' + t_1', n' + t_2')$$

based on the sensing result of the third terminal apparatus and the fourth resource, a sixth resource for sending the assistance information. For example, the third terminal apparatus chooses to send the assistance information in a slot n", where the assistance information indicates the second resource, and the second resource is, for example, an available time-frequency resource determined by the third terminal apparatus by performing sensing in the resource sensing window $[n'-t_0, n'-t_{proc,0})$ at a frequency domain size of $L_{sub}$. For determining, by the third terminal apparatus, whether the fourth resource exists and/or how to obtain the fourth resource, refer to the foregoing descriptions, and details are not described herein again.

As described above, the 1st-stage SCI is usually broadcast information, and terminal apparatuses want to receive and decode the 1st-stage SCI. Specifically, for a terminal apparatus that wants to perform sensing and that is used by a user to perform autonomous resource selection, the 1st-stage SCI includes control information for the sensing and the autonomous resource selection by the user, for example, includes one or more of time-frequency resource information, priority information, or periodic time-frequency resource information reflecting a data service period. The 2nd-stage SCI is in different formats. For example, the 2nd-stage SCI includes different control information fields for different transmissions such as geographical location-based multicast. Therefore, control information called for by terminal apparatuses supporting different standard releases or terminal apparatuses supporting different functions is carried in the 2nd-stage SCI, and the 1st-stage SCI is common information called for by terminal apparatuses (for example, including one or more types of the terminal apparatuses supporting different standard releases (for example, a 3GPP Rel-16 terminal apparatus and a 3GPP Rel-17 terminal apparatus), a terminal apparatus supporting the geographical location-based multicast, or a terminal apparatus supporting resource assistance), and includes the control information for the sensing and the autonomous resource selection by the user. In this case, the terminal apparatuses coexists in one resource pool, as time-frequency resource exclusion is performed based on the 1st-stage SCI and the terminal apparatuses excludes unavailable resources by detecting the 1st-stage SCI. This reduces a resource conflict probability and improves resource utilization.

Figure 10:
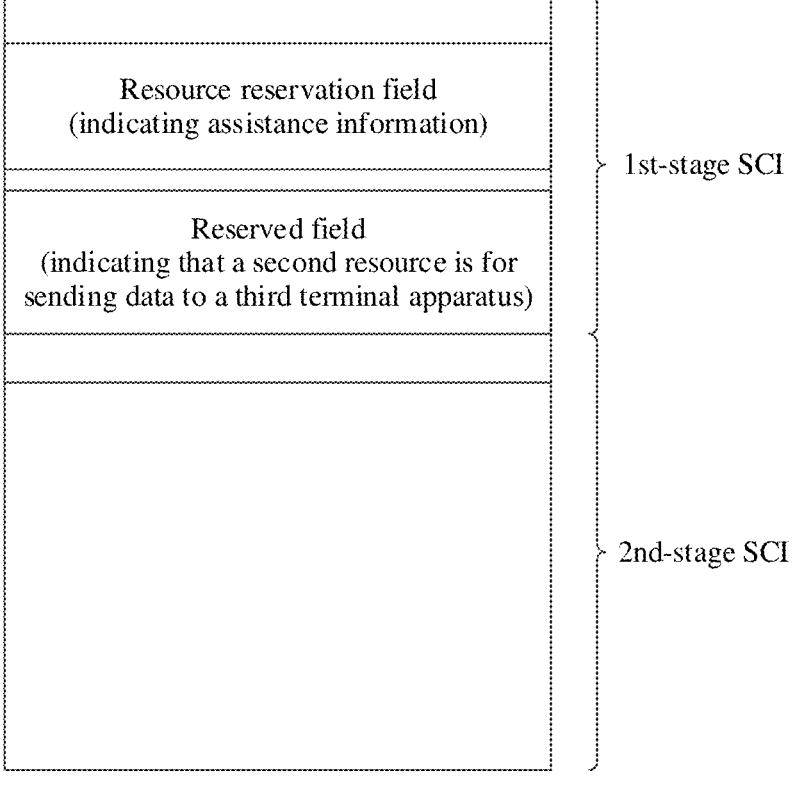
FIG. 10 is a schematic diagram of a structure of first control information in accordance with some embodiments.
Figure 11:
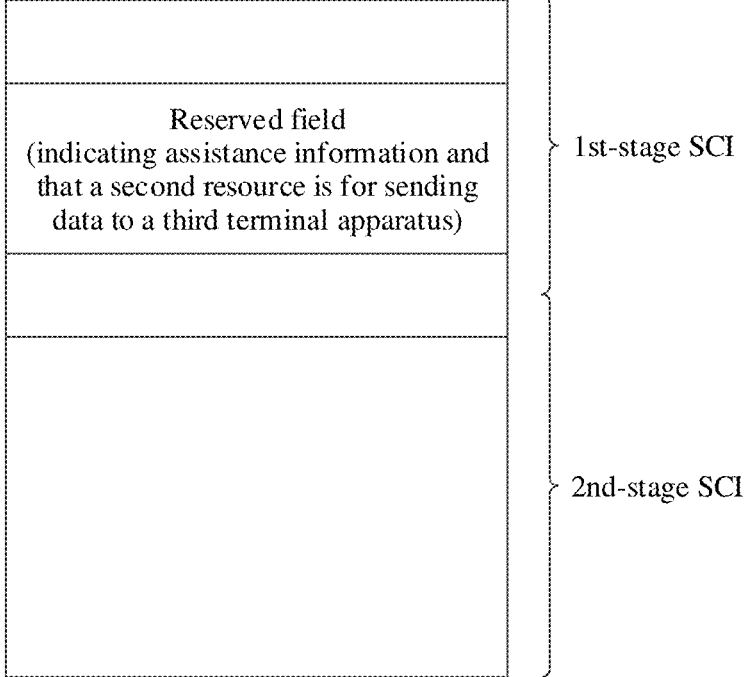
FIG. 11 is another schematic diagram of a structure of first control information in accordance with some embodiments.
Figure 12:
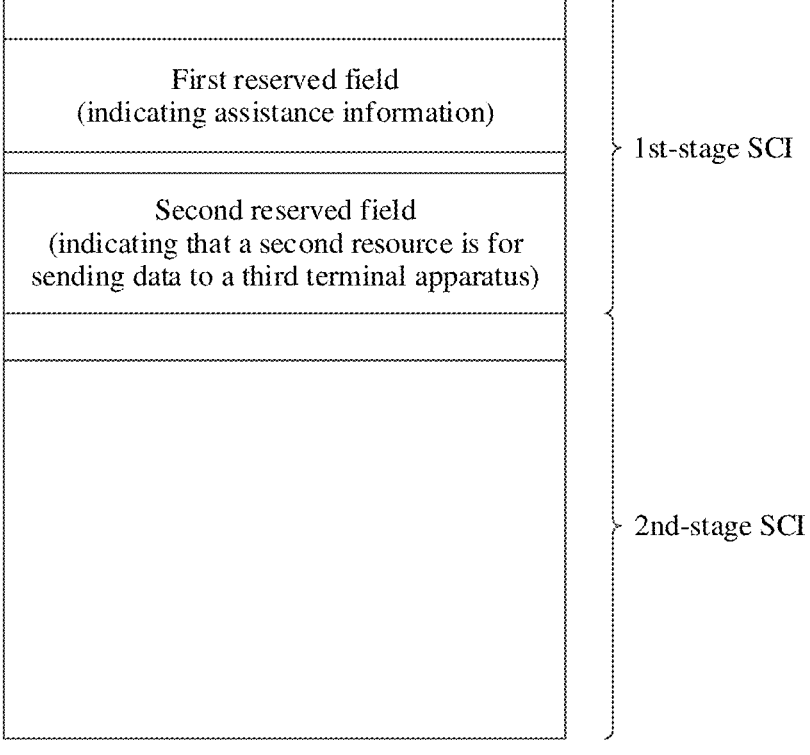
FIG. 12 is another schematic diagram of a structure of first control information in accordance with some embodiments.

Therefore, in an optional implementation of sending the assistance information, the third terminal apparatus sends the assistance information to the first terminal apparatus via 1st-stage SCI. For example, the third terminal apparatus sends first control information to the first terminal apparatus, and the first terminal apparatus receives the first control information from the third terminal apparatus. The first control information includes first SCI and second SCI. The first SCI is 1st-stage SCI, and the second SCI is 2nd-stage SCI. The first SCI includes the assistance information. For example, the first SCI includes a first field. The first field indicates the assistance information, and is a resource reservation field. Reusing an existing field to indicate the assistance information avoids a change to 1st-stage SCI in an existing release. Alternatively, the first field is a reserved field. Indicating the assistance information by using the reserved field makes 1st-stage SCI in an existing release compatible with. For example, a resource reservation field in the 1st-stage SCI is reused for the first field, to indicate the assistance information. The first SCI further includes a second field, the second field is a reserved field, and the second field indicates that a resource (namely, the second resource) indicated by the resource reservation field is for determining the resource used by the first terminal apparatus to send the data, as shown in FIG. 10. For example, the first field is a reserved field in the 1st-stage SCI, and indicates the assistance information and that a resource (namely, the second resource) indicated by the reserved field is for determining the resource used by the first terminal apparatus to send the data, as shown in FIG. 11. For another example, the first field is a reserved field (for example, a first reserved field) in the 1st-stage SCI, and the first reserved field indicates the assistance information; the first SCI further includes another reserved field (for example, a second reserved field), and the second reserved field indicates that a resource (namely, the second resource) indicated by the first reserved field is for determining the resource used by the first terminal apparatus to send the data, as shown in FIG. 12. The first SCI is 1st-stage SCI, and is sent in the broadcast manner. In response to a terminal apparatus that receives the first SCI identifying the first field (or the first field and the second field), the terminal apparatus determines that the first SCI includes the assistance information. For example, in response to the first terminal apparatus receiving the first SCI and the second SCI, and identifies the first field (or the first field and the second field), the first terminal apparatus learns that the first SCI includes the assistance information, and the first terminal apparatus obtains the assistance information from the first SCI in response to parsing the first SCI. In this manner, the first terminal apparatus identifies a format of the first SCI, to correctly obtain the assistance information.

Optionally, in response to the third terminal apparatus being configured to use the resource reservation field in the 1st-stage SCI to indicate the assistance information, in other words, the first field is the resource reservation field, the third terminal apparatus is further configured to use a period field in the first SCI to indicate a period of the second resource, and use a priority (priority) field in the first SCI to indicate a priority of the second resource. The third terminal apparatus reuses the field in the 1st-stage SCI in the existing release to indicate related information of the second resource, so that the first terminal apparatus selects an appropriate resource based on the related information of the second resource to send the data. For example, the first terminal apparatus performs resource exclusion depending on whether the period of the second resource conforms to the sending period of the first data. For another example, the first terminal apparatus performs resource exclusion depending on whether the priority of the second resource conforms to the priority of the first data. The period field in the first SCI is a resource reservation period (resource reservation period) field in the 1st-stage SCI in the existing release.

S65: The first terminal apparatus determines a third resource based on the first resource and the second resource.

After receiving the assistance information from the third terminal apparatus, the first terminal apparatus determines, based on the second resource indicated by the assistance information and/or the first resource determined based on the sensing result of the first terminal apparatus, the third resource for sending the first data to the third terminal apparatus. Some embodiments uses an example in which the first terminal apparatus sends the first data to the third terminal apparatus. However, actually, the first data alternatively is sent by the first terminal apparatus to a terminal apparatus other than the third terminal apparatus. The following briefly describes a process in which the first terminal apparatus determines the third resource based on the first resource and the second resource.

In response to the first resource being an available resource determined by the first terminal apparatus based on the sensing result of the first terminal apparatus, and the second resource is an available resource determined by the third terminal apparatus based on the sensing result of the third terminal apparatus, the first terminal apparatus selects, from an intersection between the first resource and the second resource, a resource that is to carry the first data, namely, the third resource. Optionally, in response to the intersection between the first resource and the second resource being 0, the first terminal apparatus selects, from the first resource, the resource that is to carry the first data, or select, from the second resource, the resource that is to carry the first data.

Alternatively, in response to the first resource being an available resource determined by the first terminal apparatus based on the sensing result of the first terminal apparatus, and the second resource is an unavailable resource determined by the third terminal apparatus based on the sensing result of the third terminal apparatus, the first terminal apparatus first excludes the second resource from the resource selection window $[n+t_1, n+t_2]$, to obtain a resource that remains after the second resource is excluded, and selects, from an intersection between the first resource and the resource that remains after the second resource is excluded, a resource that is to carry the first data, namely, the third resource. Optionally, in response to the intersection between the first resource and the resource that remains after the second resource being excluded is 0, the first terminal apparatus selects, from the first resource, the resource that is to carry the first data, or select, from the resource that remains after the second resource is excluded, the resource that is to carry the first data.

Alternatively, in response to the first resource being an unavailable resource determined by the first terminal apparatus based on the sensing result of the first terminal apparatus, and the second resource is an available resource determined by the third terminal apparatus based on the sensing result of the third terminal apparatus, the first terminal apparatus first excludes the first resource from the resource selection window $[n+t_1, n+t_2]$, to obtain a resource that remains after the first resource is excluded, and selects, from an intersection between the second resource and the resource that remains after the first resource is excluded, a resource that is to carry the first data, namely, the third resource. Optionally, in response to the intersection between the second resource and the resource that remains after the first resource being excluded is 0, the first terminal apparatus selects, from the second resource, the resource that is to carry the first data, or select, from the resource that remains after the first resource is excluded, the resource that is to carry the first data.

Alternatively, in response to the first resource being an unavailable resource determined by the first terminal apparatus based on the sensing result of the first terminal apparatus, and the second resource is an unavailable resource determined by the third terminal apparatus based on the sensing result of the third terminal apparatus, the first terminal apparatus excludes the first resource from the resource selection window [n+$t_1$,n+$t_2$] to obtain a resource that remains after the first resource is excluded, excludes the second resource from the resource selection window [n+$t_1$, n+$t_2$] to obtain a resource that remains after the second resource is excluded, and selects, from an intersection between the resource that remains after the first resource is excluded and the resource that remains after the second resource is excluded, a resource that is to carry the first data, namely, the third resource. Optionally, in response to the intersection between the resource that remains after the first resource being excluded and the resource that remains after the second resource is excluded is 0, the first terminal apparatus selects, from the resource that remains after the first resource is excluded, the resource that is to carry the first data, or select, from the resource that remains after the second resource is excluded, the resource that is to carry the first data.

The following uses an example in which the first resource is an available resource, the second resource is an available resource, and the quantity of sub-channels that the first data wants to occupy is $L_{sub1}$, to describe a process of determining the third resource.

Figure 13:
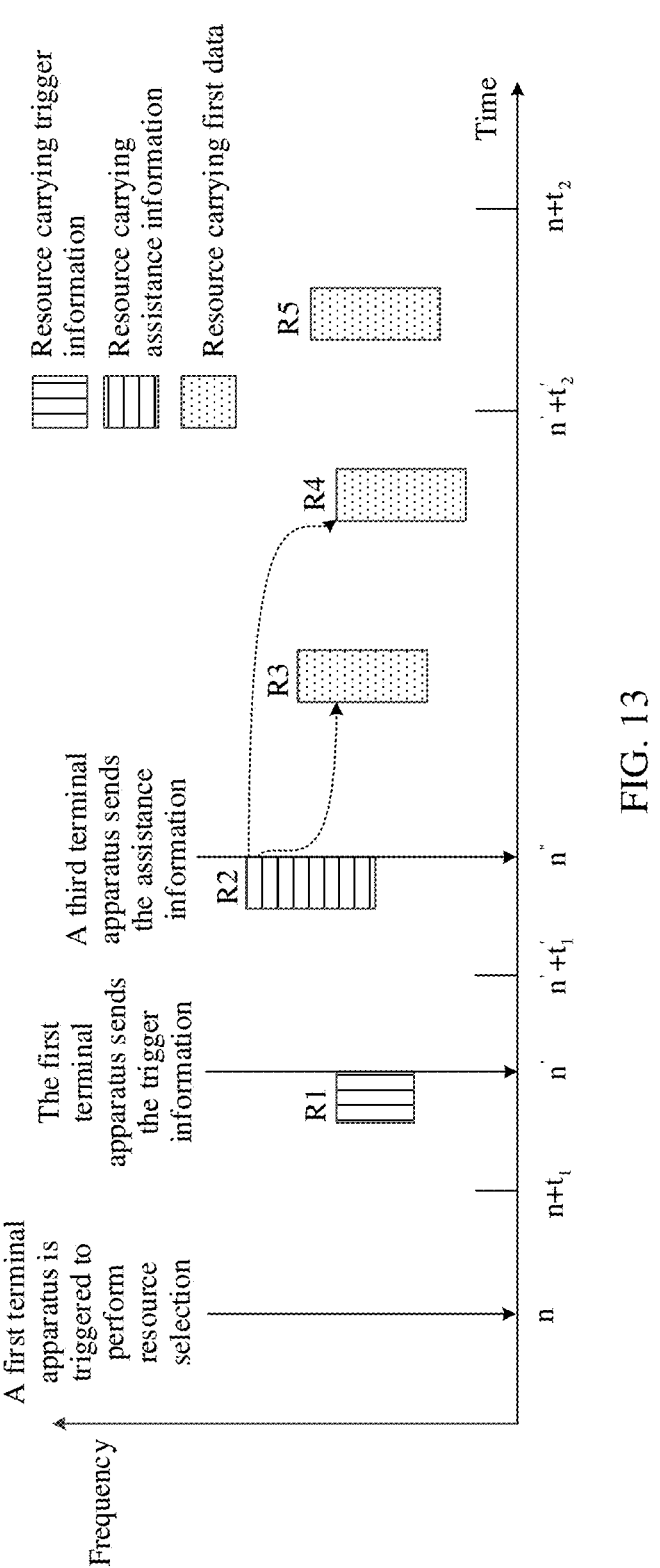
FIG. 13 is a schematic diagram of determining a third resource in accordance with some embodiments.

FIG. 13 is a schematic diagram of determining a third resource. As shown in FIG. 13, a process of determining the third resource is as follows:

S10: The first terminal apparatus triggers resource selection in a slot n, and selects, from a resource selection window [n+$t_1$,n+$t_2$] based on a sensing result in a resource sensing window [n−$t_0$,n−$t_{proc,0}$), a resource R1 (namely, a fifth resource) for sending trigger information to the third terminal apparatus and a resource R4 and a resource R5 (namely, a first resource) for sending first data to the third terminal apparatus, where the resource sensing window [n−$t_0$,n−$t_{proc,0}$) is not shown in FIG. 13.

A quantity of sub-channels included in the resource R1 is $L_{sub2}$, and quantities of sub-channels included in the resource R4 and the resource R5 are both $L_{sub1}$.

S11: The first terminal apparatus sends second control information to the third terminal apparatus in a slot n' in the resource selection window [n+$t_1$,n+$t_2$] through the resource R1, where the second control information includes third SCI and fourth SCI, the third SCI is 1st-stage SCI, the fourth SCI is 2nd-stage SCI, and the fourth SCI includes the trigger information, or the third SCI includes the trigger information.

In this embodiment, the first terminal apparatus does not recommend, to the third terminal apparatus, a resource for sending assistance information, and the quantity of sub-channels included in the resource R1 is not equal to a quantity of sub-channels that the first data wants to occupy. Therefore, the first terminal apparatus adds a new field to the fourth SCI to indicate that the quantity of sub-channels that the first data wants to occupy is $L_{sub1}$.

S12: The third terminal apparatus receives the trigger information in the slot n', and is triggered to select a resource R2 from a resource selection window $$[n' + t_1', n' + t_2']$$

based on a sensing result in a resource sensing window [n'−$t_0$,n'−$t_{proc,0}$) to send the assistance information to the first terminal apparatus, and select, based on the quantity of sub-channels called for by the first data, a resource R3 and the resource R4 (namely, a second resource) to be used by the first terminal apparatus to send the first data, where the resource sensing window [n'−$t_0$,n'−$t_{proc,0}$) is not shown in FIG. 13.

Quantities of sub-channels included in the resource R3 and the resource R4 are both $L_{sub1}$.

S13: The third terminal apparatus sends first control information to the first terminal apparatus in a slot n" in the resource selection window $$[n' + t_1', n' + t_2']$$

through the resource R2, where the first control information includes first SCI and second SCI, the first SCI is 1st-stage SCI, the second SCI is 2nd-stage SCI, and the first SCI includes the assistance information. The assistance information indicates the resource R3 and the resource R4.

For a format of the first control information, refer to FIG. 10, FIG. 11, or FIG. 12. Details are not described herein again.

S14: The first terminal apparatus receives the assistance information in the slot n", determines, based on the resource R3 and the resource R4 that are indicated by the assistance information and the resource R4 and the resource R5 that are selected by the first terminal apparatus based on the sensing result, that the resource R4 is a resource for sending the first data to the third terminal apparatus, namely, the third resource, and sends the first data to the third terminal apparatus through the resource R4.

The process of determining the third resource ends herein.

Figure 14:
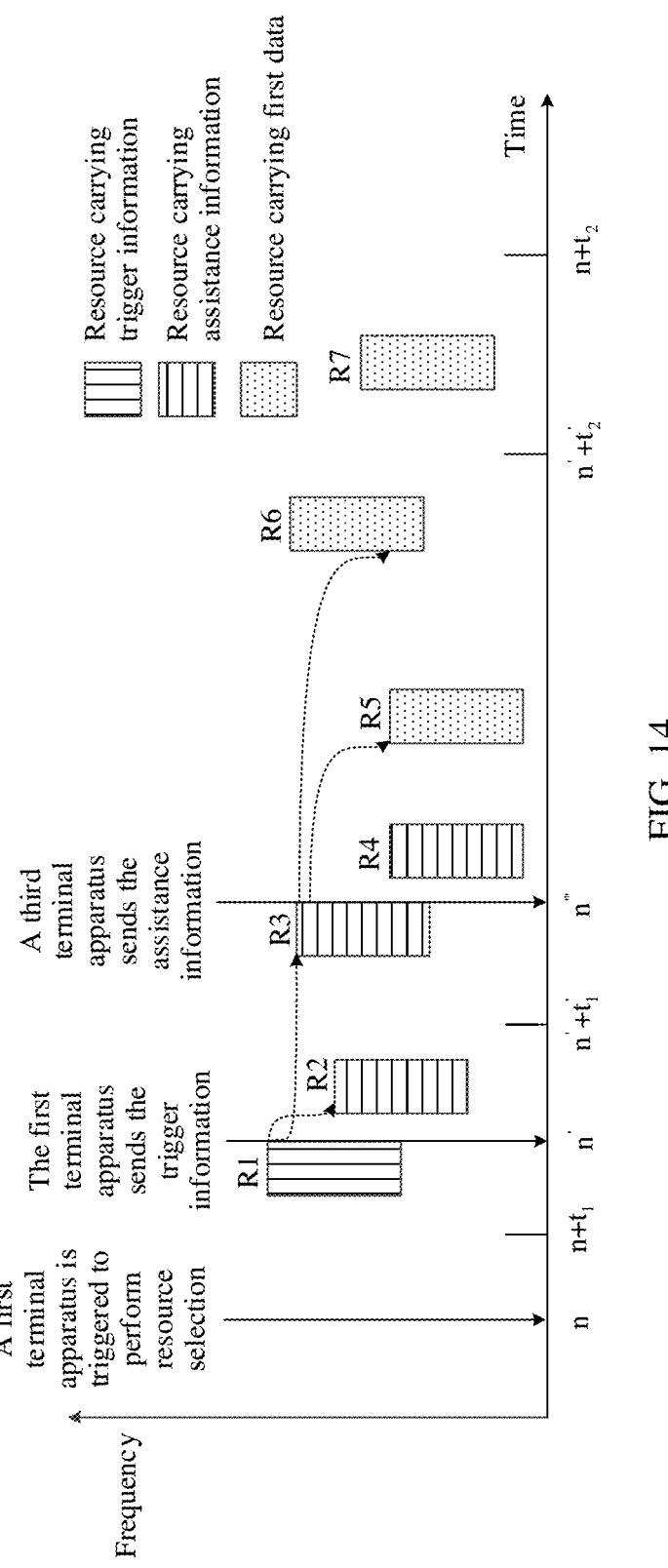
FIG. 14 is another schematic diagram of determining a third resource in accordance with some embodiments.

FIG. 14 is a schematic diagram of determining a third resource. As shown in FIG. 14, a process of determining the third resource is as follows:

S20: The first terminal apparatus triggers resource selection in a slot n, and selects, from a resource selection window [n+$t_1$,n+$t_2$] based on a sensing result in a resource sensing window [n−$t_0$,n−$t_{proc,0}$), a resource R1 (namely, a fifth resource) for sending trigger information to the third terminal apparatus, a resource R2 and a resource R3 (namely, a fourth resource) for sending assistance information by the third terminal apparatus, and a resource R6 and a resource R7 (namely, a first resource) for sending first data to the third terminal apparatus, where the resource sensing window [n−$t_0$,n−$t_{proc,0}$) is not shown in FIG. 14.

Quantities of sub-channels included in the resource R1, the resource R2, the resource R3, the resource R6, and the resource R7 are $L_{sub1}$.

S21: The first terminal apparatus sends second control information to the third terminal apparatus in a slot n' in the resource selection window [n+$t_1$,n+$t_2$] through the resource R1, where the second control information includes third SCI and fourth SCI, the third SCI is 1st-stage SCI, the fourth SCI is 2nd-stage SCI, and the fourth SCI includes the trigger information, or the third SCI includes the trigger information.

In this embodiment, a quantity of sub-channels that the first data wants to occupy is indicated by the quantity of sub-channels included in the resource R1, the resource R2, or the resource R3 instead of a separate field, so that overheads are reduced. In addition, the second control information is further configured to indicate the resource R2 and the resource R3, and indicate that the resource R2 and the resource R3 are resources for sending the assistance information by the third terminal apparatus. For a structure of the second control information, refer to FIG. 7, FIG. 8, or FIG. 9. Details are not described herein again.

S22: The third terminal apparatus receives the trigger information in the slot n', and is triggered to select, based on a sensing result in a resource sensing window $[n'-t_0,n'-t_{proc,0})$ the resource R3 and a resource R4 from a resource selection window $$[n' + t'_1, n' + t'_2]$$

to send the assistance information to the first terminal apparatus, and select, based on the quantity of sub-channels called for by the first data, a resource R5 and the resource R6 (namely, a second resource) to be used by the first terminal apparatus to send the first data, where the resource sensing window $[n'-t_0,n'-t_{proc,0})$ is not shown in FIG. 14.

Quantities of sub-channels included in the resource R3, the resource R4, the resource R5, and the resource R6 are $L_{sub1}$.

S23: The third terminal apparatus determines, based on the resource R2 and the resource R3 that are recommended by the first terminal apparatus and the resource R3 and the resource R4 that are selected by the third terminal apparatus based on the sensing result, that the resource R3 is for sending the assistance information.

S24: The third terminal apparatus sends first control information to the first terminal apparatus in a slot n''' in the resource selection window $$[n' + t'_1, n' + t'_2]$$

through the resource R3 (namely, a sixth resource), where the first control information includes first SCI and second SCI, the first SCI is 1st-stage SCI, the second SCI is 2nd-stage SCI, and the first SCI includes the assistance information. The assistance information indicates the resource R5 and the resource R6.

For a format of the first control information, refer to FIG. 10, FIG. 11, or FIG. 12. Details are not described herein again.

S25: The first terminal apparatus receives the assistance information in the slot n''', determines, based on the resource R5 and the resource R6 that are indicated by the assistance information and the resource R6 and the resource R7 that are selected by the first terminal apparatus based on the sensing result, that the resource R6 is a resource for sending the first data to the third terminal apparatus, namely, the third resource, and sends the first data to the third terminal apparatus through the resource R6.

The process of determining the third resource ends herein.

S66: The first terminal apparatus sends the first data to the third terminal apparatus through the third resource. The third terminal apparatus receives the first data through the third resource.

Some embodiments uses an example in which the first terminal apparatus sends the first data to the third terminal apparatus, but control information and/or data is actually sent. In response to the control information being sent, or the control information and the data are sent, the method in some embodiments is further applicable.

In some embodiments, the trigger information is alternatively unable to be included in the fourth SCI, and is, for example, carried in a MAC-CE; and/or the assistance information is alternatively unable to be included in the first SCI, and is, for example, carried in a MAC-CE. The foregoing procedure does not change.

In some embodiments, the first terminal apparatus sends the first information to the third terminal apparatus, to trigger the third terminal apparatus to send the second information to the first terminal apparatus, where the second information indicates the second resource. In response to selecting the resource for sending the data, the first terminal apparatus is configured to use the second resource as a reference resource. The first terminal apparatus selects, based on the sensing result of the first terminal apparatus but further the second resource indicated by the third terminal apparatus as the reference resource, the resource for sending the data. Because the second resource is determined by the third terminal apparatus based on the sensing result of the third terminal apparatus, and indicates a degree of interference caused by another terminal apparatus to the third terminal apparatus, the first terminal apparatus selects an appropriate resource based on the sensing result of the third terminal apparatus and the sensing result of the first terminal apparatus to send the data, to reduce interference, a resource conflict caused by selecting a resource the same as that of another terminal apparatus, and a resource waste caused by failing in appropriate use of a reusable resource due to excessive exclusion.

With reference to the accompanying drawings, the following describes apparatuses in some embodiments that are configured to implement the foregoing method. Therefore, the foregoing content is cited in the following embodiments. Repeated content is not described again.

Figure 15:
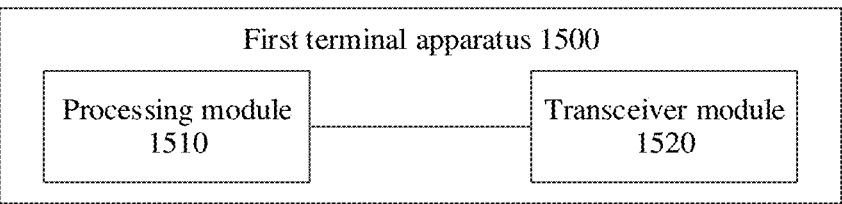
FIG. 15 is a schematic block diagram of a first terminal apparatus in accordance with some embodiments.

FIG. 15 is a schematic block diagram of a communication apparatus 1500 in accordance with some embodiments. For example, the communication apparatus 1500 is a first terminal apparatus 1500.

The first terminal apparatus 1500 includes a processing module 1510 and a transceiver module 1520. For example, the first terminal apparatus 1500 is a terminal device, or is a chip used in the terminal device, or another combined part, component, or the like that has functions of the terminal device. In response to the first terminal apparatus 1500 is a terminal device, the transceiver module 1520 is a transceiver, where the transceiver includes an antenna, a radio frequency circuit, and the like; the processing module 1510 is a processor, for example, a baseband processor, where the baseband processor includes one or more central processing units (central processing units, CPUs). In response to the first terminal apparatus 1500 is a component having functions of the terminal device, the transceiver module 1520 is a radio frequency unit, and the processing module 1510 is a processor, for example, a baseband processor. In response to the first terminal apparatus 1500 is a chip system, the transceiver module 1520 is an input/output interface of a chip (for example, a baseband chip), and the processing module 1510 is a processor of the chip system, and includes one or more central processing units. The processing module 1510 in some embodiments are implemented by a processor or a processor-related circuit component, and the transceiver module 1520 is implemented by a transceiver or a transceiver-related circuit component.

For example, the processing module 1510 is configured to perform operations, such as S61 and S65, that are performed by the first terminal apparatus in the embodiment shown in FIG. 6 except sending and receiving operations, and/or configured to support another process of the technology described in the embodiments. The transceiver module 1520 is configured to perform the sending and receiving operations, such as S62, S64, and S66, that are performed by the first terminal apparatus in the embodiment shown in FIG. 6, and/or configured to support another process of the technology described in the embodiments.

In addition, the transceiver module 1520 is one functional module, and the functional module completes both a sending operation and a receiving operation. For example, the transceiver module 1520 is configured to perform the sending and receiving operations performed by the first terminal apparatus in the embodiment shown in FIG. 6. For example, in response to the sending operation being performed, the transceiver module 1520 is considered a sending module; in response to the receiving operation being performed, the transceiver module 1520 is considered a receiving module. Alternatively, the transceiver module 1520 is two functional modules, the transceiver module 1520 is considered as a general term of the two functional modules, and the two functional modules are a sending module and a receiving module. The sending module is configured to complete a sending operation, for example, is configured to perform the sending operations performed by the first terminal apparatus in the embodiment shown in FIG. 6. The receiving module is configured to complete a receiving operation, for example, is configured to perform the receiving operations performed by the first terminal apparatus in the embodiment shown in FIG. 6.

The processing module 1510 is configured to detect sidelink control information SCI from at least one second terminal apparatus, to determine a first resource, where the first resource includes a resource unavailable to send data to a third terminal apparatus.

The transceiver module 1520 is configured to: send first information to the third terminal apparatus, where the first information is for triggering determining of second information; and receive the second information from the third terminal apparatus, where the second information indicates a second resource, and the second resource is for determining a resource for sending the data to the third terminal apparatus.

The processing module 1510 is further configured to determine a third resource based on the first resource and the second resource.

The transceiver module 1520 is further configured to send first data to the third terminal apparatus through the third resource.

In some embodiments, the transceiver module 1520 is configured to receive first control information from the third terminal apparatus, where the first control information includes first SCI, the first SCI is 1st-stage SCI, the second information is a first field in the first SCI, and the first field is a resource reservation field or a reserved field.

In some embodiments, the first SCI further includes a second field, and the second field indicates that the second resource is for determining the resource for sending the data to the third terminal apparatus.

In some embodiments, in response to the first field being the resource reservation field, a period field in the first SCI indicates a period of the second resource, and a priority field in the first SCI indicates a priority of the second resource.

In some embodiments, the transceiver module 1520 is configured to send second control information to the third terminal apparatus, where the second control information includes third SCI and fourth SCI, the third SCI is 1st-stage SCI, the fourth SCI is 2nd-stage SCI, and the fourth SCI includes the first information, or the third SCI includes the first information.

In some embodiments, in response to the fourth SCI including the first information, the third SCI includes a third field, and the third field indicates that the fourth SCI includes the first information.

In some embodiments, the third SCI includes a fourth field, and the fourth field indicates whether a fourth resource exists and/or a manner of obtaining the fourth resource; or the fourth SCI includes a fifth field, and the fifth field indicates whether a fourth resource exists and/or a manner of obtaining the fourth resource. The fourth resource is a resource for sending the second information. The manner of obtaining the fourth resource includes: The fourth resource is indicated by the third SCI, is indicated by the fourth SCI, is configured by a higher layer, or is carried by a MAC-CE.

In some embodiments, in response to the fourth SCI including the fifth field, the third SCI further includes a sixth field, and the sixth field indicates that the fourth SCI includes the fifth field.

In some embodiments, the third SCI includes a seventh field, and the seventh field indicates whether third information exists and/or a manner of obtaining the third information; or the fourth SCI includes an eighth field, and the eighth field indicates whether third information exists and/or a manner of obtaining the third information. The third information is for determining the second resource, and the third information includes at least one of a sending period of the first data, a priority of the first data, a data packet size of the first data, or a delay condition of the first data. A manner of obtaining the sending period of the first data includes: The sending period is indicated by the third SCI, is indicated by the fourth SCI, is configured by the higher layer, or is carried by a MAC-CE. A manner of obtaining the priority of the first data includes: The priority is indicated by the third SCI, is indicated by the fourth SCI, is configured by the higher layer, or is carried by a MAC-CE. A manner of obtaining the data packet size of the first data includes: The data packet size is indicated by the fourth SCI, is implicitly indicated by the fourth resource, is configured by the higher layer, or is carried by a MAC-CE. A manner of obtaining the delay condition of the first data includes: The delay condition is indicated by the fourth SCI, is configured by the higher layer, or is carried by a MAC-CE.

In some embodiments, in response to the fourth SCI including the eighth field, the third SCI further includes a ninth field, and the ninth field indicates that the fourth SCI includes the eighth field.

In some embodiments, the processing module 1510 is further configured to detect the SCI from the at least one second terminal apparatus, to determine a fifth resource. The transceiver module 1520 is configured to send the first information to the third terminal apparatus through the fifth resource.

For other functions that are implemented by the first terminal apparatus 1500, refer to the related descriptions in the embodiment shown in FIG. 6. Details are not described again.

Figure 16:
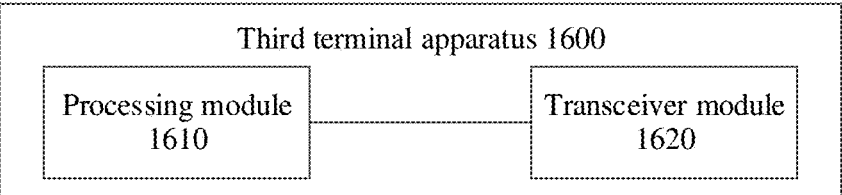
FIG. 16 is a schematic block diagram of a third terminal apparatus in accordance with some embodiments.

FIG. 16 is a schematic block diagram of a communication apparatus 1600 in accordance with some embodiments. For example, the communication apparatus 1600 is a third terminal apparatus 1600.

The third terminal apparatus 1600 includes a processing module 1610 and a transceiver module 1620. For example, the third terminal apparatus 1600 is a terminal device, or is a chip used in the terminal device, or another combined part, component, or the like that has functions of the terminal device. In response to the third terminal apparatus 1600 is a terminal device, the transceiver module 1620 is a transceiver, where the transceiver includes an antenna, a radio frequency circuit, and the like; the processing module 1610 is a processor, for example, a baseband processor, where the baseband processor includes one or more CPUs. In response to the third terminal apparatus 1600 is a component having functions of the terminal device, the transceiver module 1620 is a radio frequency unit, and the processing module 1610 is a processor, for example, a baseband processor. In response to the third terminal apparatus 1600 is a chip system, the transceiver module 1620 is an input/output interface of a chip (for example, a baseband chip), and the processing module 1610 is a processor of the chip system, and includes one or more central processing units. The processing module 1610 in some embodiments are implemented by a processor or a processor-related circuit component, and the transceiver module 1620 is implemented by a transceiver or a transceiver-related circuit component.

For example, the processing module 1610 is configured to perform operations, such as S63, that are performed by the third terminal apparatus in the embodiment shown in FIG. 6 except sending and receiving operations, and/or configured to support another process of the technology described in the embodiments. The transceiver module 1620 is configured to perform the sending and receiving operations, such as S62, S64, and S66, that are performed by the third terminal apparatus in the embodiment shown in FIG. 6, and/or configured to support another process of the technology described in the embodiments.

In addition, the transceiver module 1620 is one functional module, and the functional module completes both a sending operation and a receiving operation. For example, the transceiver module 1620 is configured to perform the sending and receiving operations performed by the third terminal apparatus in the embodiment shown in FIG. 6. For example, in response to the sending operation being performed, the transceiver module 1620 is considered a sending module; in response to the receiving operation being performed, the transceiver module 1620 is considered a receiving module. Alternatively, the transceiver module 1620 is two functional modules, the transceiver module 1620 is considered as a general term of the two functional modules, and the two functional modules are a sending module and a receiving module. The sending module is configured to complete a sending operation, for example, is configured to perform the sending operations performed by the third terminal apparatus in the embodiment shown in FIG. 6. The receiving module is configured to complete a receiving operation, for example, is configured to perform the receiving operations performed by the third terminal apparatus in the embodiment shown in FIG. 6.

The transceiver module 1620 is configured to receive first information from a first terminal apparatus, where the first information is for triggering determining of second information.

The processing module 1610 is configured to detect sidelink control information SCI from at least one fourth terminal apparatus, to determine a second resource, where the second resource is for determining a resource used by the first terminal apparatus to send data.

The transceiver module 1620 is further configured to send second information to the first terminal apparatus, where the second information indicates the second resource.

In some embodiments, the transceiver module 1620 is configured to send first control information to the first terminal apparatus, where the first control information includes first SCI, the first SCI is 1st-stage SCI, the second information is a first field in the first SCI, and the first field is a resource reservation field or a reserved field.

In some embodiments, the first SCI further includes a second field, and the second field indicates that the second resource is the resource used by the first terminal apparatus to send the data.

In some embodiments, in response to the first field being the resource reservation field, a period field in the first SCI indicates a period of the second resource, and a priority field in the first SCI indicates a priority of the second resource.

In some embodiments, the transceiver module 1620 is configured to receive second control information from the first terminal apparatus, where the second control information includes third SCI and fourth SCI, the third SCI is 1st-stage SCI, the fourth SCI is 2nd-stage SCI, and the fourth SCI includes the first information, or the third SCI includes the first information.

In some embodiments, in response to the fourth SCI including the first information, the third SCI further includes a third field, and the third field indicates that the fourth SCI includes the first information.

In some embodiments, the third SCI includes a fourth field, and the fourth field indicates whether a fourth resource exists and/or a manner of obtaining the fourth resource; or the fourth SCI includes a fifth field, and the fifth field indicates whether a fourth resource exists and/or a manner of obtaining the fourth resource. The fourth resource is a resource for sending the second information. The manner of obtaining the fourth resource includes: The fourth resource is indicated by the third SCI, is indicated by the fourth SCI, is configured by a higher layer, or is carried by a MAC-CE.

In some embodiments, in response to the fourth SCI including the fifth field, the third SCI further includes a sixth field, and the sixth field indicates that the fourth SCI includes the fifth field.

In some embodiments, the processing module 1610 is further configured to determine a sixth resource based on the fourth resource through the detection of the SCI from the at least one fourth terminal apparatus. The transceiver module 1620 is configured to send the second information to the first terminal apparatus through the sixth resource.

In some embodiments, the third SCI includes a seventh field, and the seventh field indicates whether third information exists and/or a manner of obtaining the third information; or the fourth SCI includes an eighth field, and the eighth field indicates whether third information exists and/or a manner of obtaining the third information. The third information is for determining the second resource, and the third information includes at least one of a sending period of the first data, a priority of the first data, a data packet size of the first data, or a delay condition of the first data. A manner of obtaining the sending period of the first data includes: The sending period is indicated by the third SCI, is indicated by the fourth SCI, is configured by the higher layer, or is carried by a MAC-CE. A manner of obtaining the priority of the first data includes: The priority is indicated by the third SCI, is indicated by the fourth SCI, is configured by the higher layer, or is carried by a MAC-CE. A manner of obtaining the data packet size of the first data includes: The data packet size is indicated by the fourth SCI, is implicitly indicated by the fourth resource, is configured by the higher layer, or is carried by a MAC-CE. A manner of obtaining the delay condition of the first data includes: The delay condition is indicated by the fourth SCI, is configured by the higher layer, or is carried by a MAC-CE.

In some embodiments, in response to the fourth SCI including the eighth field, the third SCI further includes a ninth field, and the ninth field indicates that the fourth SCI includes the eighth field.

In some embodiments, the processing module 1610 is configured to determine the second resource based on the third information through the detection of the SCI from the at least one fourth terminal apparatus.

For other functions that are implemented by the third terminal apparatus 1600, refer to the related descriptions in the embodiment shown in FIG. 6. Details are not described again.

Some embodiments further provide a communication apparatus. The communication apparatus is a terminal device, or is a circuit. The communication apparatus is configured to perform actions performed by the first terminal apparatus in the foregoing method embodiments.

Figure 17:
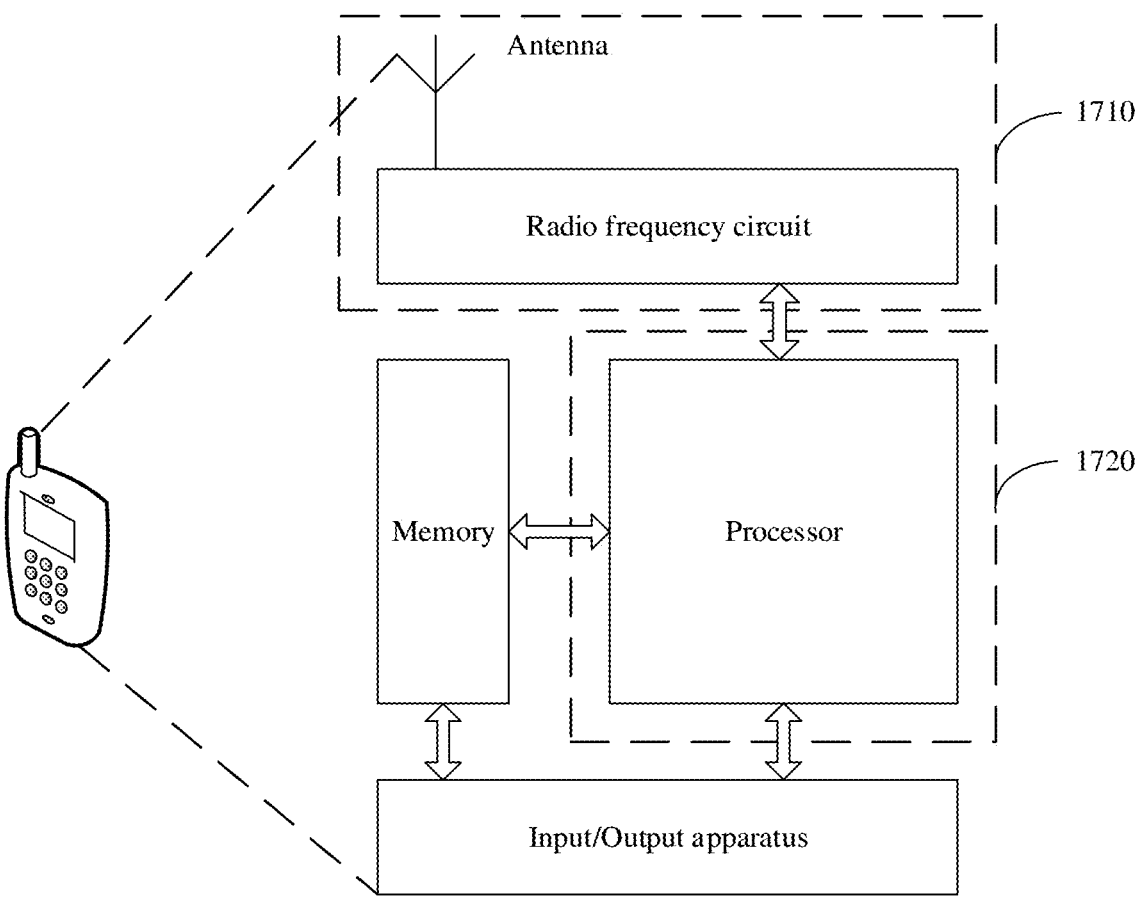
FIG. 17 is a schematic block diagram of a communication apparatus in accordance with some embodiments.

In response to the communication apparatus is a terminal device, FIG. 17 is a simplified schematic diagram of a structure of the terminal device. For ease of understanding and illustration, an example in which the terminal device is a mobile phone is used in FIG. 17. As shown in FIG. 17, the terminal device includes a processor, a memory, a radio frequency circuit, an antenna, and an input/output apparatus. The processor is configured to: process a communication protocol and communication data, control the terminal device, execute a software program, process data of the software program, and so on. The memory is configured to store the software program and the data. The radio frequency circuit is configured to: perform conversion between a baseband signal and a radio frequency signal, and process the radio frequency signal. The antenna is configured to receive and send a radio frequency signal in an electromagnetic wave form. The input/output apparatus, such as a touchscreen, a display, or a keyboard, is configured to: receive data entered by a user, and output data to the user. Some types of terminal devices is configured to have no input/output apparatus.

In response to data wants to be sent, after performing baseband processing on the to-be-sent data, the processor outputs a baseband signal to the radio frequency circuit. The radio frequency circuit performs radio frequency processing on the baseband signal and then sends a radio frequency signal to the outside in the electromagnetic wave form through the antenna. In response to data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 17 shows one memory and one processor. In an terminal device product, there is one or more processors and one or more memories. The memory further is referred to as a storage medium, a storage device, or the like. The memory is configured independent of the processor, or is integrated with the processor. This is not limited in some embodiments.

In some embodiments, the antenna and the radio frequency circuit that have sending and receiving functions are considered as a transceiver unit of the terminal device (where the transceiver unit is one functional unit, and the functional unit implements the sending and receiving functions; or the transceiver unit includes two functional units, namely, a receiving unit that implements the receiving function and a sending unit that implements the sending function), and the processor that has a processing function is considered as a processing unit of the terminal device. As shown in FIG. 17, the terminal device includes a transceiver unit 1710 and a processing unit 1720. The transceiver unit further is referred to as a transceiver, a transceiver apparatus, or the like. The processing unit further is referred to as a processor, a processing board, a processing module, a processing apparatus, or the like. Optionally, a component that is in the transceiver unit 1710 and that is configured to implement the receiving function is considered as a receiving unit, and a component that is in the transceiver unit 1710 and that is configured to implement the sending function is considered as a sending unit. In other words, the transceiver unit 1710 includes the receiving unit and the sending unit. The transceiver unit sometimes further is referred to as a transceiver, a transceiver circuit, or the like. The receiving unit sometimes further is referred to as a receiver, a receive circuit, or the like. The sending unit sometimes further is referred to as a transmitter, a transmit circuit, or the like.

In some embodiments, the transceiver unit 1710 is configured to perform a sending operation and a receiving operation on a terminal device side in the foregoing method embodiments, and the processing unit 1720 is configured to perform an operation of the terminal device other than the sending operation and the receiving operation in the foregoing method embodiments.

For example, in an implementation, the processing unit 1720 is configured to perform operations, such as S61 and S65, that are performed by the first terminal apparatus in the embodiment shown in FIG. 6 except sending and receiving operations, and/or configured to support another process of the technology described in the embodiments. The transceiver unit 1710 is configured to perform the sending and receiving operations, such as S62, S64, and S66, that are performed by the first terminal apparatus in the embodiment shown in FIG. 6, and/or configured to support another process of the technology described in the embodiments For another example, in an implementation, the processing unit 1720 is configured to perform operations, such as S63, that are performed by the third terminal apparatus in the embodiment shown in FIG. 6 except sending and receiving operations, and/or configured to support another process of the technology described in the embodiments. The transceiver unit 1710 is configured to perform the sending and receiving operations, such as S62, S64, and S66, that are performed by the third terminal apparatus in the embodiment shown in FIG. 6, and/or configured to support another process of the technology described in the embodiments.

In response to the communication apparatus is a chip-type apparatus or circuit, the apparatus includes a transceiver unit and a processing unit. The transceiver unit is an input/output circuit and/or a communication interface. The processing unit is an integrated processor, a microprocessor, or an integrated circuit.

Figure 18:
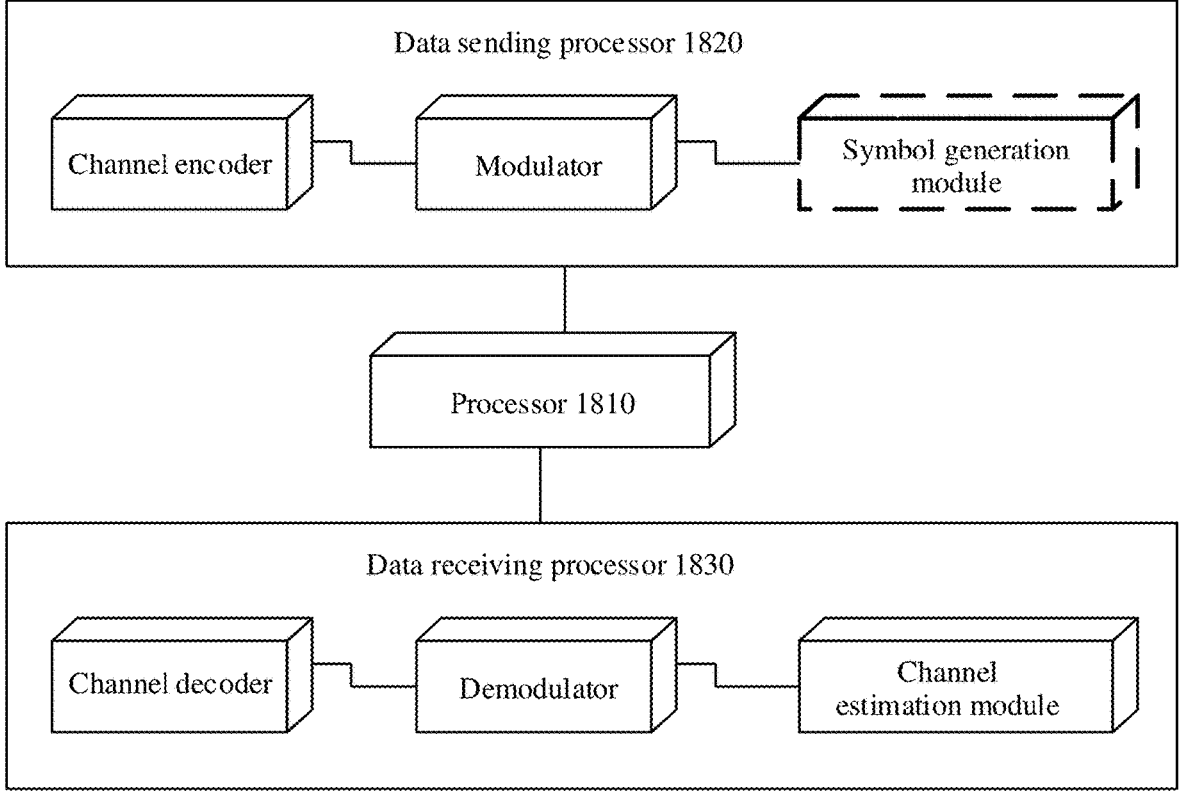
FIG. 18 is another schematic block diagram of a communication apparatus in accordance with some embodiments.

In response to the communication apparatus in this embodiment is a terminal device, refer to a device shown in FIG. 18. In an example, the device implements a function similar to the function of the processing module 1510 in FIG. 15. In another example, the device implements a function similar to the function of the processing module 1610 in FIG. 16. In FIG. 18, the device includes a processor 1810, a data sending processor 1820, and a data receiving processor 1830. The processing module 1510 in the foregoing embodiment is the processor 1810 in FIG. 18, and completes a corresponding function. The transceiver module 1520 in the foregoing embodiment is the data sending processor 1820 and/or the data receiving processor 1830 in FIG. 18, and completes a corresponding function. Alternatively, the processing module 1610 in the foregoing embodiment is the processor 1810 in FIG. 18, and completes a corresponding function. The transceiver module 1620 in the foregoing embodiment is the data sending processor 1820 and/or the data receiving processor 1830 in FIG. 18, and completes a corresponding function. Although FIG. 18 shows a channel encoder and a channel decoder, these modules are examples, and do not constitute a limitation on this embodiment.

Figure 19:
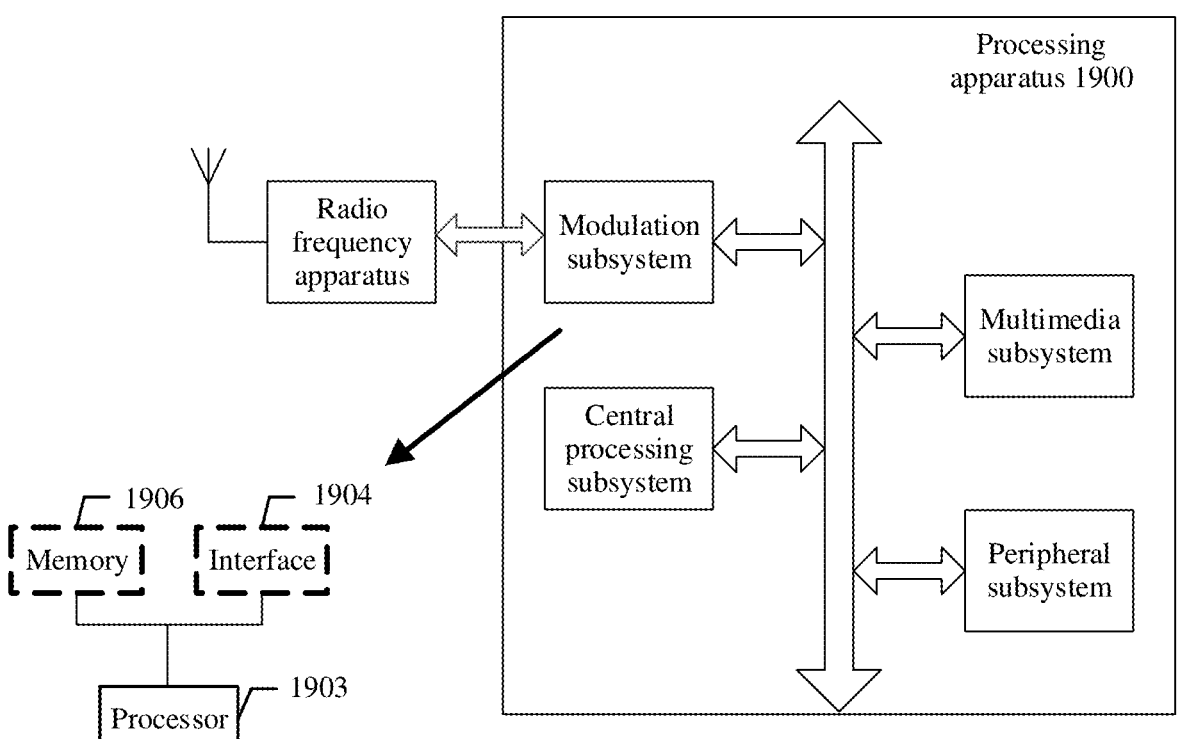
FIG. 19 is still another schematic block diagram of a communication apparatus in accordance with some embodiments.

FIG. 19 shows another form of this embodiment. A processing apparatus 1900 includes modules such as a modulation subsystem, a central processing subsystem, and a peripheral subsystem. The communication apparatus in this embodiment is used as the modulation subsystem in the processing apparatus 1900. Specifically, the modulation subsystem includes a processor 1903 and an interface 1904. The processor 1903 implements the function of the processing module 1510, and the interface 1904 implements the function of the transceiver module 1520. Alternatively, the processor 1903 implements the function of the processing module 1610, and the interface 1904 implements the function of the transceiver module 1620. In another variant, the modulation subsystem includes a memory 1906, a processor 1903, and a program that is stored in the memory 1906 and that is run on the processor. In response to executing the program, the processor 1903 implements the method on a terminal device side in the foregoing method embodiments. The memory 1906 is nonvolatile, or is volatile. The memory 1906 is located inside the modulation subsystem, or is located in the processing apparatus 1900, provided that the memory 1906 is connected to the processor 1903.

Some embodiments provide a communication system. The communication system includes the first terminal apparatus in the embodiment shown in FIG. 6 and the third terminal apparatus in the embodiment shown in FIG. 6. The first terminal apparatus is, for example, the first terminal apparatus 1500 in FIG. 15. The third terminal apparatus is, for example, the third terminal apparatus 1600 in FIG. 16.

Some embodiments further provide a computer-readable storage medium. The computer-readable storage medium stores a computer program. In response to the computer program is executed by a computer, the computer implements a procedure related to the first terminal apparatus in the embodiment shown in FIG. 6 provided in the foregoing method embodiments.

Some embodiments further provide a computer-readable storage medium. The computer-readable storage medium is configured to store a computer program. In response to the computer program is executed by a computer, the computer implements a procedure related to the third terminal apparatus in the embodiment shown in FIG. 6 provided in the foregoing method embodiments.

Some embodiments further provide a computer program product. The computer program product is configured to store a computer program. In response to the computer program is executed by a computer, the computer implements a procedure related to the first terminal apparatus in the embodiment shown in FIG. 6 provided in the foregoing method embodiments.

Some embodiments further provide a computer program product. The computer program product is configured to store a computer program. In response to the computer program is executed by a computer, the computer implements a procedure related to the third terminal apparatus in the embodiment shown in FIG. 6 provided in the foregoing method embodiments.

In some embodiments, the processor in is a CPU, or is another general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or a transistor logic device, a discrete hardware component, or the like. The general-purpose processor is a microprocessor, or the processor is any conventional processor or the like.

In some embodiments, the memory in is a volatile memory or a nonvolatile memory, or includes a volatile memory and a nonvolatile memory. The nonvolatile memory is a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory is a random access memory (random access memory, RAM), used as an external cache. By way of example and not limitation, many forms of RAMs are used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

In some embodiments, in response to the processor being a general-purpose processor, a DSP, an ASIC, an FPGA or another programmable logic device, a discrete gate, a transistor logic device, or a discrete hardware component, the memory (a storage module) is integrated into the processor.

In some embodiments, the memory described aims to include but is not limited to these memories and any memory of another appropriate type.

In some embodiments, sequence numbers of the foregoing processes do not mean execution sequences in various some embodiments. The execution sequences of the processes are determined according to functions and internal logic of the processes, and are unable to be construed as any limitation on the implementation processes of some embodiments.

A person of ordinary skill in the art is aware that, in combination with the examples described in embodiments disclosed in the embodiments, units and algorithm steps are implemented by electronic hardware or a combination of computer software and electronic hardware. Whether the functions are performed by hardware or software depends on particular applications and design constraints of the technical solutions. A person skilled in the art is configured to use a different method to implement the described functions for each particular application, but the implementation going beyond the scope of this application is unrealistic.

A person skilled in the art that, for the purpose of convenient and brief description, for a detailed working process of the foregoing system, apparatus, and unit, refer to a corresponding process in the foregoing method embodiments, and details are not described herein again.

In some embodiments, the disclosed system, apparatus, and method is implemented in other manners. For example, the foregoing apparatus embodiments are examples. For example, division into the units is logical function division and is other division during implementation. For example, a plurality of units or components are combined or integrated into another system, or some features are ignored or not performed. In addition, the displayed or discussed mutual couplings or direct couplings or communication connections are implemented by using some interfaces. The indirect couplings or communication connections between the apparatuses or units are implemented in an electrical form, a mechanical form, or another form.

The units described as separate parts are or are unable to be physically separate, and parts displayed as units may or is unable to be physical units, is located in one position, or is distributed on a plurality of network units. A part or of the units are selected based on conditions to achieve the objectives of the solutions of embodiments.

In addition, functional units in some embodiments are integrated into one processing unit, or each of the units exists alone physically, two or more units are integrated into one unit.

In response to the functions are implemented in a form of a software functional unit and sold or used as an independent product, the functions are stored in a computer-readable storage medium. Based on such an understanding, the technical solutions of the embodiments essentially, or the part contributing to the prior art, or some of the technical solutions are implemented in a form of a software product. The computer software product is stored in a storage medium, and includes several instructions for instructing a computer device (which is a personal computer, a server, a network device, or the like) to perform all or some of the steps of the methods described in some embodiments. The foregoing computer-readable storage medium is any usable medium accessible by a computer. By way of example and not limitation, the computer-readable medium includes a random access memory (random access memory, RAM), a read-only memory (read-only memory, ROM), an electrically erasable programmable read-only memory (electrically erasable programmable read-only memory, EEPROM), a compact disc read-only memory (compact disc read-only memory, CD-ROM), a universal serial bus flash disk (universal serial bus flash disk), a removable hard disk or another compact disc storage, a magnetic disk storage medium or another magnetic storage device, or any other medium that is used to carry or store expected program code in a form of an instruction or a data structure and that is accessed by a computer.

The foregoing descriptions are implementations of the embodiments, but are not intended to limit the protection scope of the embodiments. Any variation or replacement readily figured out by a person skilled in the art within the technical scope disclosed in the embodiments shall fall within the protection scope. Therefore, the protection scope of the embodiments shall be subject to the protection scope of the claims.

What is claimed is:

1. A communication method, comprising:

detecting, by a first terminal apparatus, sidelink control information (SCI) from at least one second terminal apparatus to determine a first resource that includes a resource available to send data to a third terminal apparatus;

sending, by the first terminal apparatus, first information to the third terminal apparatus, wherein the first information is configured to trigger the third terminal apparatus to perform a resource assistance procedure by determining second information, wherein the second information is an assistance information and indicates a second resource, and the second resource is for determining a resource for sending the data to the third terminal apparatus;

receiving, by the first terminal apparatus, the second information from the third terminal apparatus;

determining, by the first terminal apparatus, a third resource based on the first resource and the second resource indicated by the assistance information; and sending first data to the third terminal apparatus on the third resource, wherein the second resource is a resource unavailable to send the first data.

2. The method according to claim 1, wherein: the sending the first information to the third terminal apparatus comprises: sending second control information to the third terminal apparatus, wherein the second control information includes third SCI and fourth SCI, the third SCI is 1st-stage SCI, the fourth SCI is 2nd-stage SCI, and the fourth SCI includes the first information, or the third SCI includes the first information.

3. The method according to claim 2, wherein: the third SCI includes a seventh field that is configured to indicate whether third information exists or a manner of obtaining the third information; or the fourth SCI includes an eighth field that is configured to indicate whether the third information exists or a manner of obtaining the third information, wherein the third information is for determining the second resource, and the third information includes at least one of:

a sending period of the first data;

a priority of the first data;

a data packet size of the first data; or a delay requirement of the first data;

the method further comprising:

obtaining the sending period of the first data wherein: the sending period:

is indicated by the third SCI;

is indicated by the fourth SCI;

is configured by a higher layer; or is carried by a media access control element (MAC-CE);

obtaining the priority of the first data wherein the priority:

is indicated by the third SCI;

is indicated by the fourth SCI;

is configured by the higher layer; or is carried by a MAC-CE;

obtaining the data packet size of the first data wherein: the data packet size:

is indicated by the fourth SCI;

is implicitly indicated by a fourth resource;

is configured by the higher layer; or is carried by a MAC-CE; and obtaining the delay requirement of the first data wherein the delay requirement:

is indicated by the fourth SCI;

is configured by the higher layer; or is carried by a MAC-CE.

4. The method according to claim 3, wherein the delay requirement of the first data is a start location or an end location of a resource selection window corresponding to the second resource.

5. A communication apparatus being a first terminal apparatus, comprising:

a processor, configured to detect sidelink control information (SCI) from at least one second terminal apparatus, to determine a first resource that includes a resource unavailable to send data to a third terminal apparatus; and a transceiver, configured to send first information to the third terminal apparatus, wherein the first information is configured to trigger the third terminal apparatus to perform a resource assistance procedure by determining second information, wherein the second information is an assistance information and indicates a second resource, the second resource is for determining a resource for sending the data to the third terminal apparatus, and receive the second information from the third terminal apparatus, wherein:

the processor is further configured to determine a third resource based on the first resource and the second resource indicated by the assistance information; and the transceiver is further configured to send first data to the third terminal apparatus through the third resource, wherein the second resource is a resource unavailable to send the first data.

6. The apparatus according to claim 5, wherein the transceiver is configured to: send second control information to the third terminal apparatus, wherein the second control information includes third SCI and fourth SCI, the third SCI is 1st-stage SCI, the fourth SCI is 2nd-stage SCI, and the fourth SCI includes the first information, or the third SCI includes the first information.

7. The apparatus according to claim 6, wherein:

the third SCI includes a seventh field that is configured to indicate whether third information exists or a manner of obtaining the third information; or the fourth SCI includes an eighth field that is configured to indicate whether the third information exists or a manner of obtaining the third information, wherein the third information is configured to determine the second resource, and the third information includes at least one of:

a sending period of the first data;

a priority of the first data;

a data packet size of the first data; or a delay requirement of the first data;

the transceiver further configured to obtain the sending period of the first data wherein: the sending period:

is configured to be indicated by the third SCI;

is configured to be indicated by the fourth SCI;

is configured by a higher layer; or is carried by a media access control element (MAC-CE);

the transceiver further configured to obtain the priority of the first data wherein the priority:

is configured to be indicated by the third SCI;

is configured to be indicated by the fourth SCI;

is configured by the higher layer; or is carried by a MAC-CE;

the transceiver further configured to obtain the data packet size of the first data wherein:

the data packet size is configured to be indicated by the fourth SCI;

is configured to be implicitly indicated by a fourth resource;

is configured by the higher layer; or is carried by a MAC-CE; and the transceiver further configured to obtain the delay requirement of the first data wherein the delay requirement:

is configured to be indicated by the fourth SCI;

is configured by the higher layer; or is carried by a MAC-CE.

8. The apparatus according to claim 7, wherein the delay requirement of the first data is a start location or an end location of a resource selection window corresponding to the second resource.

* * * * *